(12) United States Patent
Obie et al.

(10) Patent No.: US 12,123,745 B2
(45) Date of Patent: Oct. 22, 2024

(54) DEVICE FOR MEASURING VARIOUS PROPERTIES OF COATINGS AND MATERIALS AND METHODS OF USING THE SAME

(71) Applicant: Wood Coatings Research Group, Inc., High Point, NC (US)

(72) Inventors: Ronald Todd Obie, High Point, NC (US); Cameron Ramil Anderson, Reidsville, NC (US)

(73) Assignee: Wood Coatings Research Group, Inc., High Point, NC (US)

( * ) Notice: Subject to any disclaimer, the term of this patent is extended or adjusted under 35 U.S.C. 154(b) by 0 days.

(21) Appl. No.: 17/679,763

(22) Filed: Feb. 24, 2022

(65) Prior Publication Data
US 2022/0397424 A1 Dec. 15, 2022

Related U.S. Application Data

(60) Provisional application No. 63/152,973, filed on Feb. 24, 2021.

(51) Int. Cl.
*G01D 1/16* (2006.01)
(52) U.S. Cl.
CPC ..................... *G01D 1/16* (2013.01)
(58) Field of Classification Search
CPC .. G01D 1/16; G01N 19/04; G01N 2203/0078; G01N 2203/0082; G01N 2203/0092; G01N 3/46; G01N 19/02
USPC ........... 73/9, 10, 53.01, 53.05, 54.01, 54.23, 73/54.36, 64.41, 81, 82, 150 R, 826, 827, 73/862, 105
See application file for complete search history.

(56) References Cited

U.S. PATENT DOCUMENTS

| 8,215,163 B2 | 7/2012 | Zhang | |
|---|---|---|---|
| 2007/0251305 A1* | 11/2007 | Huang | G01Q 10/065 |
| | | | 73/105 |
| 2016/0258852 A1 | 9/2016 | Bellamare et al. | |

FOREIGN PATENT DOCUMENTS

| GB | 2366391 A | | 3/2002 | |
|---|---|---|---|---|
| JP | 2003315034 A | * | 11/2003 | |
| JP | 2007155378 A | | 6/2007 | |
| JP | 6047045 B2 | * | 12/2016 | ........... G01B 21/047 |
| JP | 2020041988 A | * | 3/2020 | |
| KR | 20110047436 A | * | 5/2011 | |

OTHER PUBLICATIONS

Tsung-Han Hsieh, et al.: "A Conceptual Atomic Force Microscope using LEGO for Nanoscience Education", International Journal of Automation and Smart Technology, vol. 4, No. 2, dated Jun. 1, 2014.
Extended European Search Report for European Patent Application No. 22158682.9; dated Jun. 30, 2022.

* cited by examiner

*Primary Examiner* — Robert R Raevis
(74) *Attorney, Agent, or Firm* — Fox Rothschild LLP

(57) ABSTRACT

Provided are material testing devices and methods for measuring certain physical properties of materials, such as for example, drying, curing, film formation, friction, adhesion, print resistance, and scratch resistance. The testing device includes a platform, a stylus comprising a probe, an angle sensor, a linear position sensor, a control system with a power supply and a control center which may be programmed with testing parameters.

17 Claims, 19 Drawing Sheets

DEVICE FOR MEASURING VARIOUS PROPERTIES OF COATINGS AND MATERIALS AND METHODS OF USING THE SAME

FIELD

This disclosure is directed to a device for measurement of certain surface and physical properties of liquids, films, materials, coatings, and methods of using such devices.

BACKGROUND

The application, appearance, and performance of liquids and films, particularly coatings and adhesives, depend to a great extent on such properties as viscosity, drying rate or carrier evaporation, rate of cure or crosslinking, film consolidation, and viscoelastic characteristics of the film during film formation and of the final film itself. Further, the surface and physical properties of the film such as scratch resistance, mar resistance, print resistance, block resistance, hardness development, adhesion, or the like is dependent upon drying time, coating properties, and the coating system. For example, to develop the most advantageous coating for a given application, the coating must be sufficiently hard to resist printing or blocking at the time it is stacked off the end of the line. For instance, one not only needs to understand how much time is required for a coating to reach a certain performance property, but also how that performance compares to other materials developed for the same use. For example, a coating may dry to a sufficiently dry condition such that it is considered hard dry when shipped, but may not be scratch resistant enough, or have adequate adhesion when exposed to scratching or scraping to perform adequately in the field.

There are many techniques, methods, and device currently utilized to evaluate drying and curing of coatings, films, and adhesives. The drying properties of a liquid coating film have traditionally been determined by a variety of methodologies. For instance, it is common to measure the dry-to-touch of a drying film; in this method, the surface of the film is periodically touched with the analyst finger and is a subjective assessment of coating dry.

There are also many methods utilized to evaluate adhesion of the coating or film to a substrate. Some of these include, for example, tape peel testing, impact flexibility testing, lap joint and direct tensile testing. In many cases, a stylus is moved relative to a stationary substrate, and in some cases, the substrate is moved relative to the stylus. In this way, a scratch is made in the tested surface, and if the resistive forces are low enough, the coating may be removed and thus adhesion evaluated. There is a need for a scrape adhesion test that allows facile, repeatable test results utilizing a minimum amount of material surface area.

Given the aforementioned deficiencies, a need exists for a method to analytically, reproducibly, and simply, measure the drying, solidification, cure, friction, and adhesion properties of a liquid film on a substrate.

SUMMARY OF THE INVENTION

In one aspect, the invention provides material testing devices that may include a platform configured to support a material to be tested; a stylus comprising a probe receiving means; a probe configured to be received by the probe receiving means; an angle sensor configured to measure the angle of the probe relative to the platform; a linear position sensor configured to measure the position of the platform relative to the probe; and a control system comprising a power supply and a control center configured to be programmed with a set of testing parameters; wherein the platform is configured to move in one or both of the X and Y direction relative to the probe.

In one embodiment, the device may be configured to measure drying and/or curing properties of the material. In one embodiment, the device may be configured to measure adhesive properties of the material. In one embodiment, the device may be configured to measure mar resistance, print resistance and/or scratch resistance properties of the material. In some embodiments, the material may be a liquid film, a paint, a coating, a metal, a metal alloy, a composite, a plastic, wood, a mineral, or any combination thereof. In one embodiment, the material may be a liquid film on a substrate. In one embodiment, the substrate may be a well. In one embodiment, the well may have a depth of about 5 microns to about 10000 microns. In another embodiment, the substrate may be a flat plate.

In some embodiments, the probe may include a rod, shaft, ball, needle, wheel, loop, coin, chisel, knife, blade, ring, pen, cone, brush, cloth, and/or a sponge. In some embodiments, the probe may include a circular, conical, rectangular, v-edge, and/or angular cross-section. In some embodiments, the probe may include one or more of metal, metal alloy, wood, plastic, or mineral. In some embodiments, the probe may include one of more of carbon steel, stainless steel, tungsten carbide, hardened steel, plastic, or polytetrafluoroethylene (PTFE). In one embodiment, the probe may have sufficient surface area to contact the material.

In one embodiment, the device may include a load cell sensor. In one embodiment, the device may include a load cell bearing device. In one embodiment, the device may include a drive system configured to move the platform in one or both of the X and Y direction.

In one embodiment, the device may include a load generating device. In one embodiment, the load generating device may include a dead weight, a dynamic loading device, and/or a fixed loading device. In one embodiment, the device may include a control device to sense and/or control the load.

In one embodiment, the device may include a friction sensor. In some embodiments, the friction sensor is separate from the probe and/or stylus. In one embodiment, the device may include a transducer configured to examine the movement of the probe. In one embodiment, the transducer may include one or more of an encoder, a sensor, or read head paired with a code position. In one embodiment, the device may include a motor configured to move the platform.

In another aspect, the invention provides methods of using a testing device to measure a property of a material. The methods may include positioning a substrate comprising a material onto a platform of the testing device; bringing a probe into contact with the material; applying a vertical load to the probe such that a force is imparted on the material; moving the platform relative to the force applied to the probe; and sensing a height of the probe relative to the substrate. In one embodiment, the device of the methods may include an angle sensor configured to measure the angle of the probe relative to the platform; a linear position sensor configured to measure the position of the platform relative to the probe; and a control system comprising a power supply and a control center configured to be programmed with a set of testing parameters.

In one embodiment, the testing device of the method may measure friction, hardness, scratch resistance, mar resistance, print resistance, adhesion, drying and/or curing properties of the material.

In one embodiment, the method may include setting a test start position for the probe that results in low test start distances and low initial static force. In one embodiment, the load applied to the probe may be sensed and controlled by a load cell attached to a control device. In one embodiment, the method may include drying the material. In one embodiment, the material may include a liquid film. In one embodiment, the probe may be brought into contact with the liquid film after the liquid film is applied to the substrate and remains in contact with the liquid film until the liquid film solidifies.

In one embodiment, the method may include detecting the friction force imparted on the probe. In one embodiment, the method may include moving the platform perpendicular to a load cell. In one embodiment, moving the platform comprises moving manually or by an actuator and programmable device. In one embodiment, sensing may comprise sensing the direction of probe movement relative to the substrate.

In one embodiment, the method may include measuring the angle of the movement of the probe. In one embodiment, measuring the angle may include a magnetic rotary encoder. In one embodiment, measuring the angle may include an angle encoder based on photoelectric scanning principles. In one embodiment, the encoder may have an integral bearing. In one embodiment, the method may include converting the angle measurement to a linear measurement.

BRIEF DESCRIPTION OF THE FIGURES

The accompanying drawings, which are incorporated herein and constitute part of this specification, are illustrative of particular embodiments of the present disclosure and do not limit the scope of the present disclosure. The drawings are not to scale and are intended for use in conjunction with the explanations in the following detailed description.

DETAILED DESCRIPTION OF THE INVENTION

Figure 1:
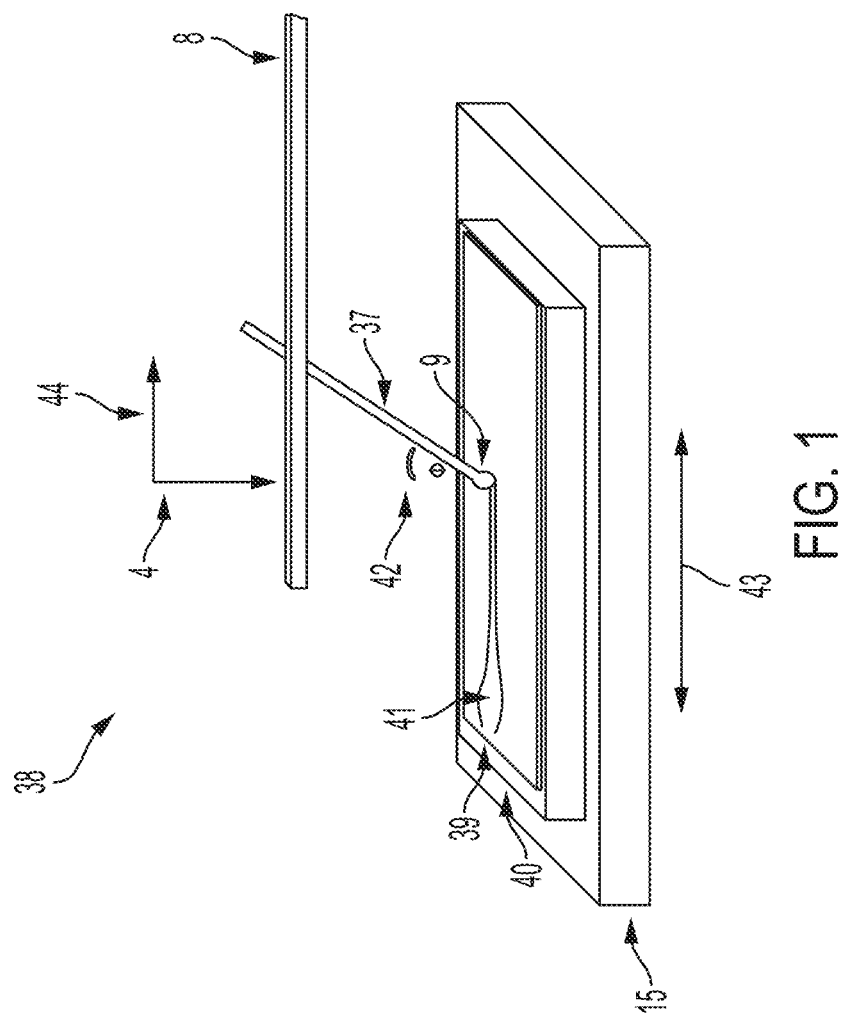
FIG. 1 illustrates measurement of a liquid film drying process using a dry, cure, and adhesion testing device.

The following discussion omits or only briefly describes conventional features of the disclosed technology that are apparent to those skilled in the art. It is noted that various embodiments are described in detail with reference to the drawings, in which like reference numerals represent like parts and assemblies throughout the several views. In drawings that depict multiple like components, a single representative component may be identified by the appropriate reference numeral. Reference to various embodiments does not limit the scope of the claims appended hereto. Additionally, any examples set forth in this specification are intended to be non-limiting and merely set forth some of the many possible embodiments for the appended claims. Further, particular features described herein can be used in combination with other described features in each of the various possible combinations and permutations. Although any methods and materials similar or equivalent to those described herein can be used in the practice or testing of embodiments of the present disclosure, selected methods, devices, and materials are now described.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, elements, and/or components, but do not preclude the presence or addition of one or more other features, steps, operations, elements, components, and/or groups thereof.

Viscoelastic refers to the behavior of materials displaying both viscous and elastic behavior. Viscous behavior is the ability of the material to resist shear flow and strain linearly with time when a stress is applied. Viscosity is a friction coefficient and refers to the resistance of a liquid to flow, demonstrating a loss of energy. Elasticity is the ability of the material to strain when stretched and immediately return to its original state once the stress is removed, demonstrating a storage of energy. Such values can be expressed for both liquid materials as well as solid materials. With respect to study of drying and curing, these values are expressed as a function of distance and/or time.

Friction refers to the force resisting the relative motion of solid surfaces, fluid layers, and material elements sliding against each other.

The process of drying involves physical and/or physiochemical changes such as solvent evaporation, solidification, oxidation, chemical cure, crosslinking, and polymerization as a function of time. The various stages of drying can be difficult to quantify and drying is dependent upon many factors. Such factors include chemistry, atmospheric conditions, film thickness, substrate, etc. During the drying process physical properties of the sample change that result in drying events such as a change in film thickness, shrinkage, increases in viscosity, increases in friction, hardness, tackiness, dry-to-touch, etc. Thus, these drying events may be monitored by a probe traveling through and/or on a liquid and/or solidified film detecting the occurrence of the drying events.

There are many techniques, methods, and device currently utilized to evaluate drying and curing of coatings, films, and adhesives. The drying properties of a liquid coating film have traditionally been determined by a variety of methodologies, however most methods of evaluating and monitoring drying are subjective and provide little quantitative assessment. For instance, it is common to measure the dry-to-touch of a drying film where the surface of the film is periodically touched with the analyst finger to assess coating dryness. Other methods, such as ASTM D5895, include applying a coating to a substrate and moving a stylus across or through the coating before visually assessing the track of the stylus to qualitatively determine set-to-touch, tack-free, dry-hard, and through-dry times. Drying may also be evaluated by gravimetric means where the film is monitored for change in weight as a function of time. Coating film properties may be assessed by evaluation of the film after most of the solvent has evaporated from the film; such methods include measurement of hardness development as a function of time such as pencil hardness, scratch hardness, tukon hardness, etc. Another technique to characterize the rate of drying and curing of coatings is Adaptive Speckle Imaging Interferometry (ASII), that optically quantifies dynamics of drying films and coatings. Additionally, ASTM D4473 provides a method of assessing cure rate as measured by time to dynamic gel point displayed by complex viscosity measurements at 100 pa·s using a rheometer coupled with a plate-plate measuring system configuration. This method is most useful for liquids that do not contain volatile solvents, as the presence of volatile solvents may unduly impact true film consolidation, crosslinking, and final viscoelastic behavior measured.

A drawback of the methods described above for assessing dry and cure is that many are quite subjective, and others provide only a snapshot of the film consolidation process, or further, do not allow evaporation of volatiles from the film which would lead to erroneous drying behavior results. Further, liquid as well as consolidated films display viscoelastic behavior; measurement of viscoelastic behavior during film drying and after film consolidation provides a more accurate and detailed analysis of the drying process and physical properties of the consolidated film. Thus, there is still a need to provide mechanical type drying time recorders which provide easily identified and quantifiable drying time events and drying times.

An important property after consolidation of a material, such as for example, a liquid, coating, polymer, film, etc., is that of adhesion. Adhesion is the attraction between bodies that are dissimilar. ASTM D907 on Terminology of Adhesives defines adhesion as "The state in which two surfaces are held together by interfacial forces which may consist of valence forces or interlocking action or both."

Current methods utilized for evaluating adhesives include for example tape and tape peel testing, impact flexibility testing, lap joint and direct tensile testing. ASTM D 5179, D 4541, and ISO 4624 cover adhesion testing of organic coatings to substrates by gluing a stud to the surface of the coated part followed by determining the tensile force required to separate the coating from the substrate by pulling the stud by tensile testing. The methods require great skill, considerable preparation time to perform, and significant amounts of specimen to test, especially if duplicate or triplicate tests are to be performed. Another example of a procedure for conducting an adhesion or scratch test, involves bringing the stylus into contact with the surface of the material to be evaluated at a specified initial load. After setting an initial load with the stylus in contact with the surface, the test is initiated. A possible outcome of this protocol is the measurement of a high initial static load and correspondingly high initial frictional resistance followed by a modulation in friction resistance as kinetic friction forces begin to dominate the measurement. In such cases, this static friction force may damage the surface of delicate samples such that a true measurement of scratch and adhesion becomes difficult. This type testing then appears somewhat limited with respect to evaluating delicate samples that are easily damaged before actual testing is conducted. On the other hand, testing at high loads is somewhat limited due to limitations of the load cell due to potential load cell damage or inaccuracies due to side loading forces acting upon the load cell when the stylus is moved across a surface under load. Further, since the friction force sensor is usually associated with the stylus, inaccuracies in both friction force and normal force may ensue due to lateral movement and angular tipping of the stylus to the degree the friction force sensor moves due to friction force measurement. Thus, there is a need for a testing device and method that can mitigate the effects of static friction forces at the beginning of a test, thus expanding the lower limit of testing of the system. Further, for delicate samples requiring low normal force loads, and/or highly resistive samples requiring high normal force loads, there is a need for a testing device and method that mitigates side loading forces on a load cell during testing, thus increasing greatly the available testing load capability. There is also a need to measure friction force independent of a stylus.

The present disclosure relates to a device and methods for measuring certain physical properties of materials, such as for example, drying, curing, film formation, friction, adhesion, print resistance, and scratch resistance.

One embodiment is directed to a method of measuring drying events during drying of liquid films and material specimens, such as coatings and adhesives during the drying or curing process. Particularly advantageous benefits of the discovery include the ability to graphically see the drying events in real time compared to estimating these events visually after the test cycle, especially for non-pigmented liquid films which are particularly problematic. Other particularly advantageous benefits of the invention include freedom of the system from damage to the load sensing device under side loading conditions, and thus small and large loads may be evaluated under side loading conditions. Also, friction measurements are made without the friction force sensor attached to the stylus member. Further, measurements are initiated free of static loads and thus very delicate samples may be evaluated for scratch and adhesion at very low initial forces.

Another embodiment is directed to a material testing device for measuring the drying and curing properties of a liquid film. The device comprises a platform for supporting a substrate having a test surface of a liquid film or material, a probe mounted so as to contact the liquid film or material, a tester that includes a load bearing member and sensors, and a means of effecting relative movement of the substrate while the probe is contacting the surface of the liquid film or material, to obtain a quantitative measurement of the drying, curing, solidification, and adhesion properties of the film as a function of time.

Another embodiment of the present invention is directed to a material testing device for measuring the adhesion properties of a solidified liquid film or material specimen. The device comprises a platform for supporting a substrate having a test surface of a solidified liquid film or a material, a probe mounted so as to contact the solidified liquid film or material, a tester that includes a load cell bearing device and sensors, and a means of effecting relative movement of the substrate or material while the probe is contacting the solidified liquid film or material, to obtain a quantitative measurement of the adhesion properties of the film as a function of load, loading rate, and platform travel rate.

Another embodiment of the present invention is directed to a material testing device for measuring the scratch resistance properties of a solidified liquid film or material specimen. The device comprises a platform for supporting a substrate having a test surface of a solidified liquid film or a material, a probe mounted so as to contact the solidified liquid film or material, a tester that includes a load bearing member and sensors, and a means of effecting relative movement of the substrate or material while the probe is contacting the solidified liquid film or material, to obtain a quantitative measurement of the scratch resistance properties of the film as a function of load, loading rate, and platform travel rate.

Another embodiment of the present invention is directed to a device for measuring the print resistance properties of a solidified liquid film or material specimen. ASTM D 2064 defines print resistance as "the ability of a paint film to resist forming a permanent impression in a semi-hardened film as a result of a pressure from an object placed on it". Printing relates to the indentation of a surface or the leaving of an impression of a fabric into a lacquered surface, thus disfiguring it.

The tester may comprise a load bearing member which eliminates side loading forces and may act to apply a normal load to the probe in a controlled manner. The tester may also include a plurality of sensors to sense and control the applied load, the height of the load applying member, the height of the measurement probe, travel of the platform, and friction forces.

The substrate can include any means of supporting a liquid film, solidified liquid film or material such as a well, trough, plate, flat plate, or panel. In some embodiments, the device does not include a substrate.

As used herein, the term "liquid film" refers to resins or other liquid compositions that can form a self-supporting continuous film on at least a horizontal surface of a substrate upon removal of any diluents or carriers present in the composition, drying, or upon curing at ambient or elevated temperature. Conventional film-forming resins that may be used include, without limitation, those typically used in packaging coating compositions, automotive OEM coating compositions, automotive refinish coating compositions, industrial coating compositions, architectural coating compositions, coil coating compositions, and aerospace coating compositions, among others. In some embodiments, the liquid film is solidified or partially solidified. Solidification of the liquid film may occur by drying, curing, cross-linking, or consolidating the liquid film-forming composition. A material may include but is not limited to adhesives, paints, coatings, resins, powders, polymers, plastics, glass, metal, wood, cementitious materials, rubber, paper, and/or fabric.

The probe can include a sphere, ball, loop, rod, coin, knife, pen, cone, needle, tool, sharp edge, chisel, ring, wheel, brush, cloth, sponge, or other probe structure capable of being mounted so as to contact the material, liquid film or solidified liquid film on the substrate. In some embodiments, the probe includes a wheel. The wheel may have a smooth surface, or it may be textured. In some embodiments, the probe may comprise a circular, conical, rectangular, v-edge, and/or angular cross-section. In some embodiments, the probe comprises of one of more of carbon steel, stainless steel, tungsten carbide, hardened steel, plastic, or Teflon (polytetrafluoroethylene (PTFE)).

The probe may be supported by a stylus. The stylus may be any means of holding the probe above, against or within the surface of the liquid film or material. In some embodiments, the stylus is a rod shaped structure comprising the probe on one end. In some embodiments, the stylus is a block or a brush. In other embodiments, the probe is not associated with a stylus. In some embodiments, the stylus may be made out of steel. In some embodiments, the stylus may be made out of any suitable material to meet the objective. For instance, if a very light weight stylus is required, the stylus may be made out of wood, composite, or plastic. In some embodiments, the probe may be configured as a pen, such that the probe may act like a stylus and the point being the probe of interest.

In some embodiments, the stylus may be configured with a probe receiving means such as a clamp used to attach a probe. In some embodiments the clamp is removable from the stylus. In other embodiments the clamp is permanently attached to the stylus. In some embodiments, the clamp is configured to hold and secure various probes as described herein. In some embodiments, the probe is secured to the clamp with a set nut. In some embodiments, instead of or in addition to the clamp, the stylus the probe receiving means may comprises a hole into which the probe is secured, either with or without a set nut. The clamp and the hole may be at different or the same positions on the stylus, for example, at either end of a rod shaped stylus.

The probe may be contacted with the liquid film immediately after the liquid film is introduced onto the substrate. In other embodiments, the probe is contacted with the liquid film at a predetermined time after the liquid film-forming composition is introduced onto the substrate. In other embodiments, the probe is contacted with the liquid film after it is partially or completely dried or cured. In other embodiments, the probe may remain in contact with the liquid film throughout the drying, curing, consolidation, or aging process, such as for example using a dead weight, a spring-loaded mechanism, or a dynamically controlled loading device, or a fixed loading device.

The present disclosure is also directed to a device for determining drying events of the liquid films such as dry-to-touch time, tack-free-time, dry-hard-time, dry-through-time, friction, viscosity, hardness as a function of time, scratch, and mar, and adhesion of the cured films as a function of time. After solidification of the film, scratch, mar, and adhesion may be measured with a probe as a function of time, temperature, loading rate, platform speed, etc. In some embodiments, the solidification, scratch, mar and adhesion of the film may be monitored using a control system. In some embodiments, the solidification, scratch, mar and adhesion of the film may be monitored manually by the user.

The device described herein may be suitable for determining the drying properties, the solidifying properties of a large variety of different types of liquid films, and the subsequent scratch and adhesion properties of the subsequently consolidated films. The types of liquid films which are readily analyzed and studied by the invention include, but are not limited to thermoplastic, thermoset, solvent based, water based, UV, and solvent free films.

For example, the embodiments are suitable for monitoring films which solidify as a consequence of crosslinking, such as 2K epoxies, 2K polyurethanes, ultraviolet and electron beam cured films, peroxide cured films, oxidizable films, free-radically cured films, phenolic cured films, urea-formaldehyde and melamine formaldehyde cured films, etc. Further, films that dry by solvent or water evaporation may also be monitored. Further powder coatings may be evaluated. The embodiments are also useful for monitoring the cure, dry, and properties of adhesives.

The embodiments are useful for monitoring the drying of pigmented compositions such as inks and coatings. Other examples of the many applications of the invention include drying of paints, water flash off of aqueous UV coatings, curing of UV coatings, drying and hardening of adhesives, etc. Further, the invention allows the assessment of the influence of undercoats and/or substrate on the dry and solidification of a subsequent coating, for example. Further, once the film is consolidated (e.g., cured), the invention enables the scratch, mar, and adhesion analysis of the consolidated film to be assessed.

The film thickness of the sample to be assessed may be varied by the depth of the well or the application thickness of the liquid film. It is preferable that the film thickness mimic an actual liquid film drying or curing process. It is also preferable that the temperature profile and air flow rate to which the film would be exposed in an actual liquid solidification process be reproduced as well. For example, if a coating or paint is the liquid film to be monitored, then the film thickness may be shallow having a depth ranging from about 5 microns to about 10160 microns, from about 10 microns to about 1000 microns, from about 25 microns to about 300 microns, and from about 25 microns to about 150 microns. The overall specimen with test surface with or without substrate may have a depth ranging from about 5 microns to about 114300 microns, from about 3175 microns to about 25400 microns, and from about 6350 microns to about 12700 microns.

Now referring to FIG. 1 which illustrates a drying process. A load 4 is applied to a pendulum bar 8 resulting in a load on stylus and probe 9, held at an angle Φ 42 as the liquid film 39 on the substrate 40 and substrate support 15 moves under the stylus 9 at a velocity. Φ 42 may be any angle between ±90 degrees to normal. The load 4 is imposed on the stylus and probe 9, tending to push or hold stylus and probe 9 against the liquid film 39 on the substrate 40. As a result of drying events, a track 41 is created in the surface of the liquid film 39 on the substrate 40. In general, when the load 4 applied to the stylus and probe 9 is substantially perpendicular to the surface of the substrate 40 with or without a liquid film 39 or some other type of specimen, the load 4 may be referred to as a "normal load." When the platform or substrate support 15 moves under the load 4, there is also imposed on the system a side load 44. This side load 44 is due, at least in part to a "friction force". The amount of side load 44 or "friction force" imposed on the system will vary depending upon the load 4, and the properties of the sample.

It is believed that as the film dries, the film builds up in front of the probe. When the film has dried sufficiently, the film will resist being pushed by the probe and force the probe to rise in height over the build-up of film in front of the probe. The film will continue to dry until such time that it is not sticky any longer and will not build up due to plowing by the probe, at which point the height of the probe will drop dramatically. The height of the probe can therefore be measured to determine drying events in the film.

In an embodiment as illustrated in FIG. 1, the substrate 40 or specimen is supported by the substrate support 15 during the drying or adhesion testing process. In an embodiment, the substrate 40 or specimen may be secured to the substrate support 15 while the substrate support 15 moves below the stylus 9. The substrate 40 may be secured to the work surface by any suitable means, including without limitation clamps, screws, etc. In an alternative embodiment, the substrate 40 or specimen is not secured to a work surface. In an alternative embodiment the substrate 40 or specimen is simply held in place by a blocker 60 located against the substrate 40 or specimen in the direction of the side load 44. In this configuration then, if a sensor is placed between the blocker 60 and the substrate 40 or specimen, or if the blocker 60 is replaced by a sensor, the side load 44 or "frictional force" may be measured.

Figure 2:
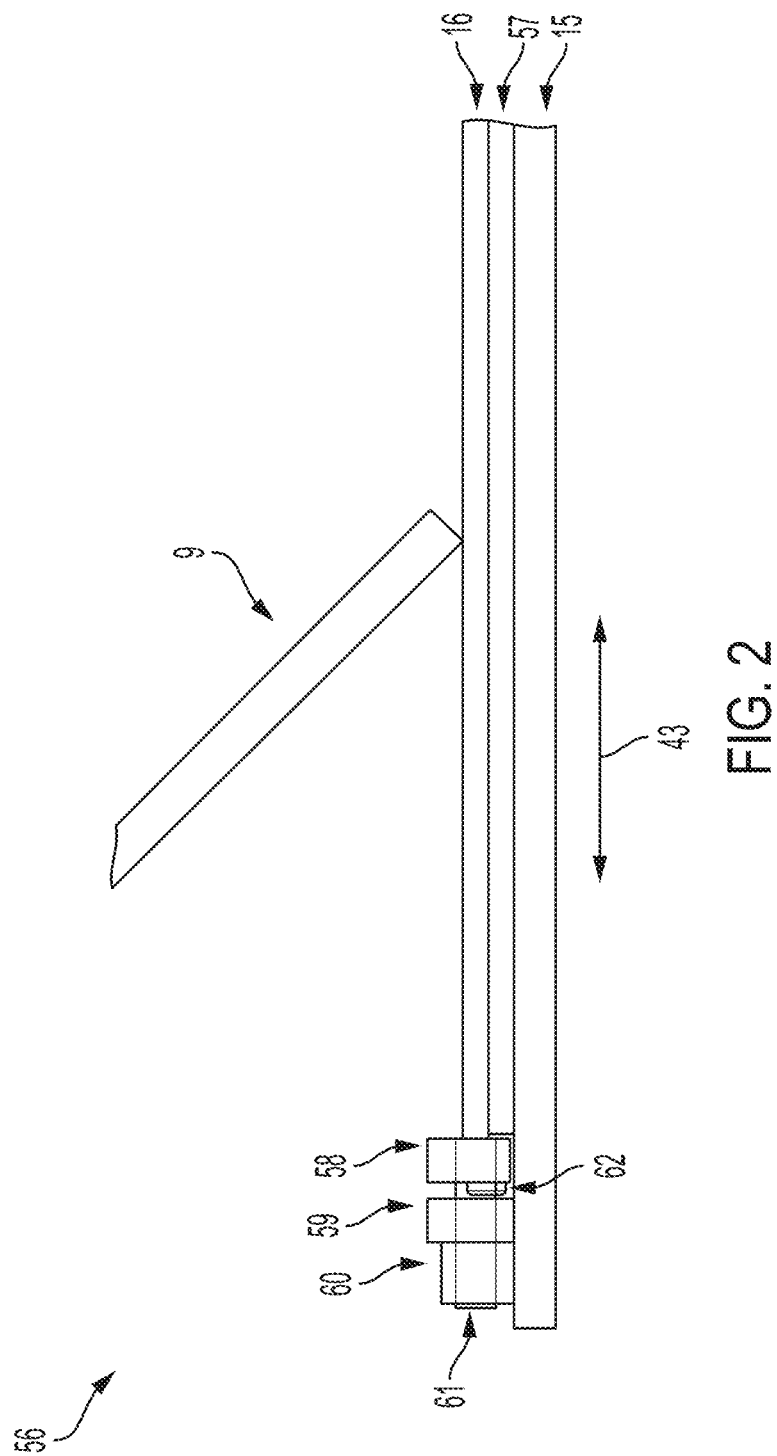
FIG. 2 illustrates a side schematic view of an embodiment of the dry, cure, and adhesion testing device, illustrating incorporation of a friction sensor.

In one embodiment, the friction sensor 59 may be configured as in FIG. 2. In this manner, the test surface 16 is supported by a frictionless substrate support 57 over the substrate support 15. Substrate with test surface 16 is held against a moveable bumper 58 having a button 62 for contacting sensor 59 by friction force 44. The friction sensor 59 is held in place by an immovable or anchored bumper 60 attached to substrate support 15. The entire assembly 56 moves with the platform during the test. The frictionless substrate support 57 may be generated or consist of air, magnetism, cylinders, rollers, balls, spheres, bearings, wheels, pendulum, drawer slides, track with rollers, including dualvee systems, hinge with ball bearings, liquids, solids, waxes, lubricants or anything of the sort. The friction force sensor 59 may be any suitable device capable of measuring a linear force such as those based on strain gage technology, piezo technology, compressive load cells, cantilever based sensors, hydraulic based sensors, pneumatic, piezoelectric crystal, inductive, capacitive, magnetostrictive, resistive, optical, ultrasonic, based. Force sensor contact button 62 does not of necessity need to be in the shape of a button, but any configuration and material may be utilized which effectively contact the sensing area of the friction/force sensor 59 without imposing sensing errors. In one embodiment, the moveable bumper 58 is allowed to move frictionless by two sliding rods, 61 attached to the bumper on either side of the force sensor contact button 62. The two sliding rods 61 slide through two bushings (not shown). In another embodiment, the moveable bumper 58 is made frictionless by attaching it to a hinge with ball bearings type assembly.

Figure 3:
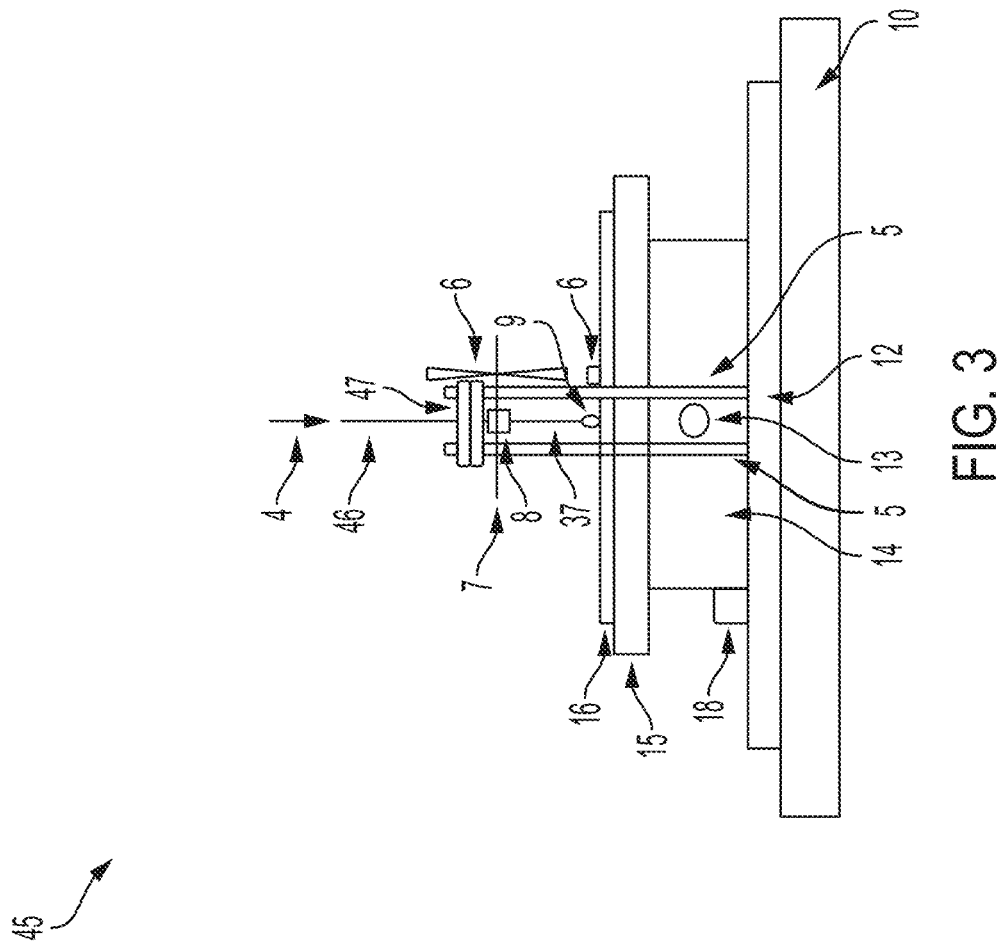
FIG. 3 is a front schematic view of an embodiment of a dry, cure, and adhesion testing device with a dead weight.
Figure 4:
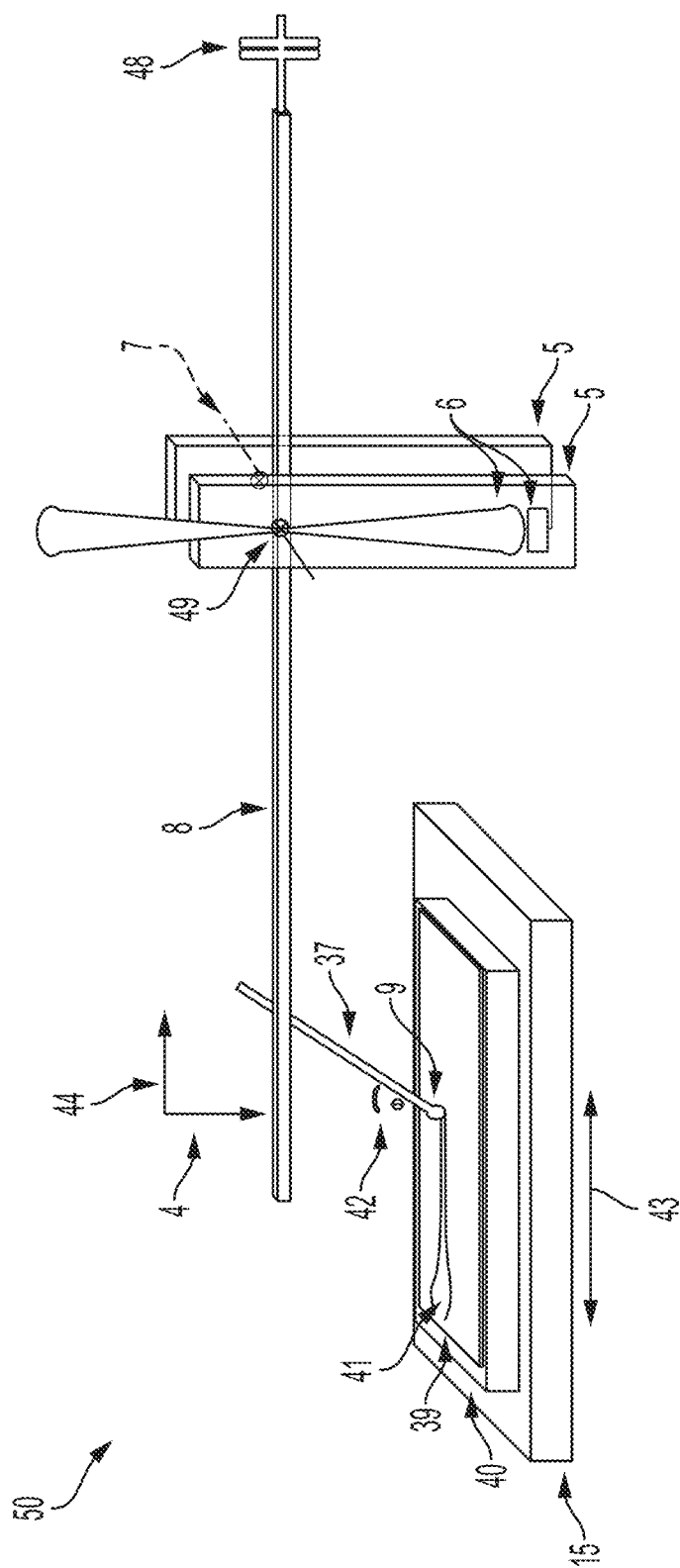
FIG. 4 is a side schematic view of an embodiment of a dry, cure, and adhesion testing device.

FIG. 3 illustrates a front view of a dry, cure, and adhesion testing device 45 utilizing a dead weight. FIG. 4 is a side view of a dry, cure, and adhesion testing device 50. Dry, cure, and adhesion testing device 45 and 50 comprise a substrate with test surface 16, a probe and stylus 9, a dead weight 47, load 4, pendulum bar 8, bearings and/or bushings 49, pendulum counterweight 48 to balance the pendulum bar 8, side load bearing member 5, axle 7, horizontal drive member 14, horizontal drive system 13, drive support member 12, and base 10. Testing device 45 and 50 further comprise a linear position sensor 18, an angle sensor 6, and a frictional force sensor. In other embodiments, an alternative z-height sensor may be used instead of the angle sensor 6. The probe and stylus 9 are both removably fixed to the pendulum bar. In an embodiment some or all the components may be utilized.

Figure 5:
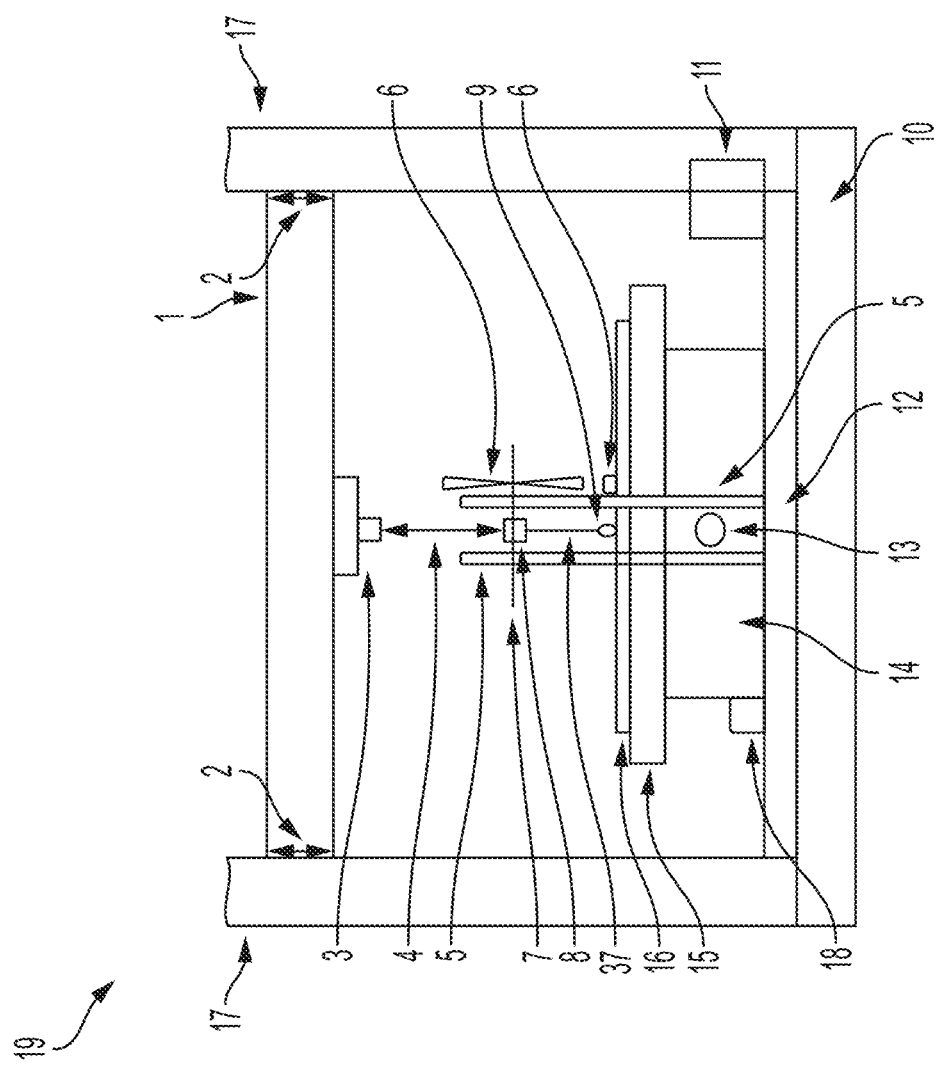
FIG. 5 is a front schematic view of and embodiment of a dry, cure, and adhesion testing device with a dynamic load control.

FIG. 5 illustrates a front view of a dry, cure, and adhesion testing device 19 utilizing dynamic loading device. Including the components illustrated in FIGS. 3 and 4, FIG. 5 comprises a loading element 1, loading element support 17, and a vertical drive motor 11. Dry, cure, and adhesion testing device 19 further comprise load cell sensor 3. The loading element 1 can move in the z direction 2 and is sensed by a sensor. Movement in the z direction 2 is controlled in response to the required load as required from feedback from the load cell sensor 3 to the vertical drive motor 11 which controls the loading element 1. In an embodiment, the device further comprises a momentary switch coupled with the loading element 1 which may be utilized to initiate the beginning of movement by the horizontal drive system. The momentary switch may be electrical, pneumatic, magnetic, or a plunger sensor which utilizes the imaging, photoelectric measuring principle and a singlefield reflective scanning method.

In some embodiments, the substrate support 15 can be moved manually in an x-direction and/or a y-direction. In some embodiments, the substrate support 15 can be moved automatically in an x-direction and/or a y-direction.

Referring to FIGS. 3 and 5, the horizontal drive system 13 controls the linear motion of the specimen or substrate with test surface 16 and horizontal drive member 14 in the x-direction 43 with a specified velocity. The horizontal drive system 13 is coupled to the horizontal drive member 14 and the substrate support 15. The substrate with test surface 16 is then affixed to the substrate support 15 and the entire system then moves in the x-direction 43 with a specified velocity. In an embodiment, the horizontal drive system 13 can be any system or method utilized to translate the specimen, such as an actuator, motor and controller. Translation may be accomplished by, but not limited to, a mechanical lead screw, a hydraulic system, a pneumatic system, a belt and pulley system. The horizontal drive system is equipped with a horizontal position sensor to detect, and by feedback loop, control the position of the horizontal drive system. In one embodiment, the position sensor is a magnetic sensor. In another embodiment, the position sensor is a linear optical encoder system. In yet another embodiment, the sensor is an encoder attached to a motor coupled to a lead screw, and by feedback loop, senses and controls the position of the substrate with test surface 16 in the x-direction. In one embodiment, a dualvee guide wheel system may be utilized as actuator coupled to a motor and lead screw and controller and a magnetic sensor. The coupling prevents the translator from moving in the y-direction or the z-direction. It is to be understood that the y-direction is orthogonal to both the x-direction 43 and the z-direction 2. The motor can be any motor capable of supplying the necessary power to move the actuator. The controller can be any technology capable of controlling the system such as a computer, or microcontroller, control boxes, switches, relays, servos, motor drivers, microcomputers. In one embodiment, a programmable logic controller may be utilized. By controlling the horizontal drive system 13 the position of the stylus 9 on the surface of the substrate with test surface 16 are thereby controlled. Use of the horizontal drive system 13 to control the motion of the substrate support 15 and thereby the surface of the substrate with test surface 16, may enable very fine and precise control over the test position.

Referring to FIGS. 1, 4, and 5, side load 44 is transferred to the pendulum bar 8, side load bearing plates 5, axle 7 and bushings or bearings 49. In this way, damage to the load cell sensor 3 as well as errors associated with side loading, angular loading, eccentric loading, or twisting loading, are mitigated. Further, probe and stylus 9 is slidingly disposed in the pendulum bar 8 so that the pendulum bar 8 remains level as the thickness of the substrate with test surface 16 changes. In one embodiment testing drying, the probe and stylus 9 is a Teflon ball attached to the stylus. In another embodiment for testing adhesion, for example, the probe and stylus 9 may be a hardened metal loop attached to the stylus or a rounded hardened metal cylinder attached to the stylus, or made into a continuous stylus. In yet another embodiment testing print resistance, the probe and stylus is a wheel that is used to test the ability of a paint film to resist forming a permanent impression in a semi-hardened film as a result of a pressure from an object placed on it.

Referring to FIGS. 1-5, although the stylus and probe 9 are slidingly disposed in the pendulum bar 8, once level is obtained, the position of the stylus and probe 9 is set with a set screw such that the stylus and probe 9 no longer moves within the sleeve of the pendulum 8. The tip of the stylus and probe 9 may still move in the z-direction due to forces acting on the stylus and probe 9 such as load 4, or in response to forces acting on the stylus and probe 9 in the z-direction by the test surface 16. The tip of the stylus and probe 9 may move in the z-direction due to change in height of the film while drying, or due to peeling away of the surface of the test surface 16 during testing. This movement is because the pendulum 8 is affixed to an axle 7 that is allowed to freely rotate. The rotation of the axle 7 and hence of the pendulum 8 is in response to a change in height at the tip of the stylus and probe 9 as the test conditions change, either through change of thickness of a drying sample due to shrinkage, change in thickness of a sample due to peeling or indentation of the surface or due to load 4 acting in the z-direction. In the embodiments shown in FIGS. 1-5, the stylus with probe 9 does not move in the y-direction.

Referring to FIG. 3, the dead weight 47 is loaded onto the stylus and probe 9 by way of a platform on the pendulum bar to achieve the desired load 4 acting on the stylus and probe 9. The load 4 tends to push the tip of the probe 9 against or into the surface of the specimen or substrate with test surface 16. Depending on the test, the amount of dead weight 47 acting on the stylus and probe 9 may be varied. The height of the tip of the probe against the surface of the specimen or substrate with the test surface 16 may be determined by a sensor 6. The sensor 6 allows the height of the substrate with the test surface 16 and/or the substrate to be measured and zeroed without imposing a static load on the system. The sensor may be any suitable sensor for sensing an angular displacement at a high sensitivity, approaching 0.001 degree resolution, including a magnetic sensor, a rotary shaft encoder, optical rotary shaft encoder, encoders based on the Photoelectric scanning principle inclusive of imaging scanning principle and interferential scanning principle. Example sensors include but are not limited to the MC and MS brands of exposed linear encoders, MSA brand sealed linear encoders, and MCR and MCS brand of modular angular encoders (Heidenhain subsidiary, RSF Elektronik Ges.m.b.H., Tarsdorf 93, 5121 Tarsdorf, Austria). Other examples include the LIK series incremental encoders, LAK series absolute encoders, Kit L series incremental encoders, LIA series incremental encoders, encoders for vacuum applications, LAK and KIT LA series absolute encoders (Heidenhain subsidiary, Numerik Jena GmbH, Im Semmicht 4, 07751, Jena, Germany). Other examples include absolute and incremental rotary encoders with and without commutation tracks, absolute and incremental angle encoders, absolute and incremental linear encoders, and absolute and incremental modular encoders (Dr. Johannes-Heidenhain-Straße 5, 83301 Traunrent, Germany). In some embodiments, the sensor is contactless so as to not impose friction on the system. In some embodiments, the angle sensor is configured as FIG. 6 using an incremental linear sensor. In this manner, a linear measurement is determined from an angular movement about axle 7 and is correlated to a movement of the tip of stylus and probe 9.

Referring to FIGS. 3-6, angle sensor 6 is composed of an optical sensor system that utilizes semicircle containing structure 54 attached immovably to axle 7 which freely rotates within bushings and/or bearings 49 (inclusive of air bearings) set within side load bearing plates 5. In one embodiment the end of the semicircle containing structure 54 may be shaped as semi-circle and is equally balanced about the axle 7 whether through design or by use of adjustable weights. In another embodiment, the semicircle containing structure 54 is not balanced about the axle. A sensor head 53 is placed in close proximity (by way of platform 52) to the bottom of the semi-circle shape of the semicircle containing structure 54 to which has been attached a sensor measuring tape 55. As one skilled in the art understands the semicircle containing structure 54 may be in any configuration and made of any materials. For example, the semicircle containing structure 54 may be without limitation, rectangular, cylindrical, oval, etc. It may be constructed of metal, steel, aluminum, plastic, composite, alloy, etc. In another embodiment the semicircle containing structure may be shaped as an entire circle or as circle with teeth attached as a gear. In one embodiment the sensor may be one which utilizes the imaging, photoelectric measuring principle and a singlefield reflective scanning method. In one embodiment, sensors that meet the criteria include, but are not limited to, exposed linear encoders such as MS15 (RSF Elektronik Ges.m.b.H., Tarsdorf 93, 5121 Tarsdorf, Austria) and LIKgo optical encoder (Numerik Jena GmbH, Im Semmicht 4, 07751, Jena, Germany). In one embodiment, the angle sensor 6 measures the height change of the pendulum 8 as an angular motion. In one embodiment, the angle sensor 6 measures the height change of the pendulum 8 as a linear motion, which can be converted into and angular motion. In one embodiment, the angular motion may be turned into a linear motion by utilization of a gear train. In another embodiment, the angular motion is turned into a linear motion by use of a rack and pinion gearing system. In another embodiment, the angular motion is turned into a linear motion by an interferometer sensing technique.

Once the desired load 4 has been achieved, an operator may start the horizontal drive system 13 causing the substrate support 15 and substrate with test surface 16 to move in the x-direction 43 under the stylus and probe 9. The location, direction, speed, and acceleration of the substrate with test surface 16 may be varied by controlling the horizontal drive system 13. Depending on the test to be performed, the substrate with test surface 16 may be moved with a constant speed or with a variable speed by adjusting the horizontal drive system 13. The device 45 comprises a plurality of sensors including but not limited to a load cell sensor 3, a z-direction sensor, a friction force sensor 59, an angle sensor 6, and a linear position sensor 18.

Referring to FIG. 5, a dynamic controlled load 4 is loaded onto the stylus and probe 9 to achieve the desired load 4 acting on the stylus and probe 9. The dynamic load 4 is imposed by the loading element 1 and its movement in the z-direction 2 controlled by the vertical drive motor 11. The loading rate, loading control, timing, acceleration, direction, quantity of, and duration of load 4 can be varied by controlling the vertical drive motor 11. A particular advantage of the invention is that because the load 4 is controlled to specified values, and the load 4 is applied by the height of the loading element 1 by movement in the z-direction 2, which is controlled by the vertical drive motor 11, any movement by the vertical drive motor 11 is related to movement of the loading element 1, and thus to the tip of the stylus and probe 9. The load 4 tends to push or hold the tip of the probe 9 against the surface of the specimen or substrate with test surface 16 depending on the test. The height of the tip of the probe against the surface of the specimen or substrate, or within the specimen or substrate, with the test surface 16 may be determined by a sensor 6.

In some embodiments, a sensor may be situated in the vicinity of the loading element 1 and loading element support 17 such that it detects the movement of the loading element in the z-direction 2. Any linear position sensor may be utilized including but not limited to resistive based sensors, capacitive based sensors, inductive based sensors such as LVDT, LVIT, LVRT, magnetic based sensors including Hall effect, magneto-resistive, magneto-strictive, Time-of-Flight sensors such as ultrasonic- or laser-based, Pulse-encoding sensors such as optical- and magnetic-based. In one embodiment, an absolute multiturn rotary encoder sensor is coupled to vertical drive motor 11 and by feedback loop control lead screw(s) and keep position based on the pitch and lead of the screw(s) and thus position of loading element 1 and thus load 4. The position of the loading element movement in z-direction 2 is recorded as the loading element 1 is adjusted to maintain desired load 4. Simultaneously, load cell sensor 3 records the load 4 and through feedback loop controls position of the loading element 1. In one embodiment angle sensor 6 allows the height of the substrate with the test surface 16 and/or the substrate to be measured and zeroed without imposing a static load on the system from loading element 1. The sensor may be any suitable sensor for sensing angular displacement at a high sensitivity, approaching 0.001 degree resolution, including a magnetic sensor, a magnetic rotary encoder, an angle encoder, a rotary shaft encoder, optical rotary shaft encoder, encoders based on the Photoelectric scanning principle inclusive of imaging scanning principle and interferential scanning principle. In some embodiments, the encoder may have an integral bearing. Example sensors include but are not limited to the MC and MS brands of exposed linear encoders, MSA brand sealed linear encoders, and MCR and MCS brand of modular angular encoders (Heidenhain subsidiary, RSF Elektronik Ges.m.b.H., Tarsdorf 93, 5121 Tarsdorf, Austria). Other examples include LIK series incremental encoders, LAK series absolute encoders, Kit L series incremental encoders, LIA series incremental encoders, encoders for vacuum applications, LAK and KIT LA series absolute encoders (Heidenhain subsidiary, Numerik Jena GmbH, Im Semmicht 4, 07751, Jena, Germany). Other examples include absolute and incremental rotary encoders with and without commutation tracks, absolute and incremental angle encoders, absolute and incremental linear encoders, and absolute and incremental modular encoders (Dr. Johannes-Heidenhain-Straße 5, 83301 Traunrent, Germany). In some embodiments, the sensor is contactless so as to not impose friction on the system. In some embodiments, the angle sensor is configured as FIG. 6 using an incremental linear sensor. In this manner, a linear measurement is determined from an angular movement about axle 7 and is correlated to a movement of the tip of stylus and probe 9.

Once zero position and/or the desired load 4 has been achieved, an operator may initiate a test which simultaneously or individually start the vertical drive motor 11 and horizontal drive system 13 causing the substrate support 15 and substrate with test surface 16 to move in the x-direction 43 under the stylus and probe 9, and loading element 1 to move in the z-direction 2. The location, direction, speed, and acceleration of the substrate with test surface 16 may be varied by controlling the horizontal drive system 13 and the loading rate, loading control, timing, acceleration, direction, quantity of, and duration of load 4 may be varied by controlling the vertical drive motor 11. Depending on the test to be performed, the substrate with test surface 16 may be moved with a constant speed or with a variable speed by adjusting the horizontal drive system 13. Depending on the test to be performed, the loading element 1 may be moved with a constant speed or with a variable speed by adjusting the vertical drive motor 11. The device 19 comprises a plurality of sensors including but not limited to a load cell sensor 3, a z-direction sensor, a friction force sensor 59, an angle sensor 6, and a linear position sensor 18.

Referring to FIGS. 3 and 5, during a test the substrate with test surface 16 is moved in the x-direction 43 under the tip of the stylus and probe 9 thereby creating a track or scratch, or mar, or indentation, or adhesion loss, depending upon the specific test, in the surface of the specimen or substrate with test surface 16. At the completion of the test, the movement of the substrate with test surface 16 and the movement of the loading element 1 may be stopped by controlling the drive system 13 and vertical drive motor 11. The load 4 may be removed by removing the deadweight 47 or raising the loading element 1, and the specimen or substrate with test surface 16 may be removed from the work surface 15 for further examination.

In one embodiment, the device allows determination of a viscosity. Utilizing a two plate model, shear viscosity is defined as shear stress divided by shear rate. Shear stress is defined as force divided by area while shear rate is defined as velocity divided by thickness. Because of the uniqueness of the invention, thickness of the specimen layer between the probe and the substrate is constantly monitored by angle sensor 6 or any sensor that it detects the movement of the loading element in the z-direction 2, or an absolute multiturn rotary encoder sensor coupled to vertical drive motor 11. The velocity of the substrate and test surface 16 is known by controlling the horizontal drive system 13. The area of the tip of the stylus and probe 9 is known. In the invention, friction force is only associated with the interaction of the stylus and probe 9 and the surface of the test specimen since the friction sensor 59 is not attached to the scratching member and is thus independent of the stylus and probe. Thus by measuring the friction force with a sensor 59 as described, an instantaneous viscosity may be obtained by use of the novel invention.

In another embodiment, a spring-loaded mechanism, rather than a deadweight, is used to provide a load to the stylus and probe 9. The load transmitted by the spring-loaded mechanism may be a constant load or a variable load during the test.

In another embodiment, the loading element 1, loading element support 17, base 10, vertical drive motor 11, and load 4 are provided by a universal testing machine such as an Instron Machine (Instron, 825 University Avenue Norwood, Mass. 02062-2643).

In certain embodiments, the horizontal drive system 13 is capable of varying the linear speed of the horizontal drive member 14 and thus the substrate support 15 and substrate with test surface 16 under the stylus and probe 9 anywhere from about 0 to 1000 mm/s, or alternatively from about 1 to about 400 mm/s. The vertical drive motor 11 is capable of varying linear speed of the loading element 1 in the z-direction 2 anywhere from about 0 to about 1000 mm/min. Further, the vertical drive motor 11 is capable of varying rate of load of the loading element 1 in the z-direction 2 anywhere from about 0 to about 1000 mm/min. Further, as one skilled in the art understands, the drive motor used to move and control the horizontal drive system 13 and the vertical drive motor 11 may be any suitable device capable of moving the horizontal drive plate 14, substrate support 15 substrate with test surface 16 and loading element 1 under a load, including without limitation electric motors, hydraulic actuators, internal combustion engines, etc. Still further, the drive motor may be coupled to the actuator directly or indirectly through gears, belts, pulley system, etc. It is also to be understood in other embodiments that there can be a plurality of motors and actuators for horizontal as well as vertical movement control and any suitable means of controlling the position and motion of the horizontal drive system 13 and loading element 1 may be employed including without limitation geared systems, track systems, etc.

Referring to FIGS. 1-5, stylus and probe 9 are connected to pendulum bar 8 which is pivotally connected to load bearing member 5 through axle 7. This configuration allows friction free movement of the stylus and probe 9 in the z-direction in response to forces acting on the tip of the stylus and probe 9 such as load 4, surface forces from the substrate with test surface 16, counterweight 48, or shrinkage or swelling of the test surface 16.

Referring to FIG. 4, pendulum bar 8 has an extension and counterweight 48. The counterweight 48 is provided to balance the pendulum bar 8 about axle 7, and thus balance stylus and probe 9 so that no imbalanced force is imposed on the substrate with test surface 16 before or at the beginning of the test. As one skilled in the art understands the pendulum bar 8 may be in any configuration and made of any materials. For example, the pendulum bar 8 may be without limitation, rectangular, cylindrical, oval, etc. It may be constructed of metal, steel, aluminum, plastic, composite, alloy, etc.

Referring to FIG. 5, the load cell sensor 3 is attached to the loading element 1. Load 4 is transferred to the pendulum bar 8 by a semicircle containing structure attached to the load cell sensor 3. The semicircle containing structure has a rounded radius tip so as to evenly distribute load 4 to the pendulum bar 8 without placing side loads on the load cell sensor 3 during loading upon contact of the semicircle containing structure with the pendulum 8. Load 4 is thus transferred to the stylus and probe 9. The semicircle containing structure is not limited in its composition or shape. The semicircle containing structure may be made of metal. The semicircle containing structure may be made of plastic. In some embodiments, the plastic semicircle containing structure eliminates high initial contact forces as the semicircle containing structure contacts the pendulum bar 8. As one skilled in the art understands, any suitable means may be utilized to transfer load 4 to the pendulum bar 8. The load 4 tends to push the stylus and probe 9 against the surface of the substrate with test surface 16. Further the device 19 may be capable of providing a constant or variable load 4 (e.g., increasing load during testing, decreasing load during testing, etc.). The load 4 may be effected by any load generating device capable of providing a load to the probe and stylus 9, including without limitation a pneumatic diaphragm, a hydraulic actuator, a spring-loaded mechanism, an electrical actuator, etc. In one embodiment, the load generating device is a universal testing machine such as an Instron testing machine.

The load cell sensor 3 measures the actual load 4 applied to the pendulum bar 8 and thus the stylus and probe 9 as long as the stylus 37 and probe 9 are in line with the load 4. The load cell sensor 3 may be any suitable device capable of measuring a linear force. A particular advantage of the invention is that the device is configured such that load 4 is always introduced vertically, directly in line with load cell sensor 3, with minimal extraneous forces. Not to be limited by theory, extraneous forces greatly degrade the performance and useful life of load cells. Another significant advantage of the invention is that the device allows free evaporation of volatiles during drying of the specimen or substrate with test surface 16, since there is no carriage to hold the stylus 37 and probe 9 in place over the surface and the pendulum bar 8 may be well displaced from the surface of the specimen.

A friction force sensor 59, such as that illustrated in FIG. 2, is removably or irremovably placed on the substrate support platform 15 between the substrate with test surface 16 and a removably placed stopper 60. The removably place stopper 60 may be held in place by any suitable means such as screws, clamps, etc. In one embodiment, it is held in place simply by pegs in holes. The friction force sensor 59 may be an integral part of the stopper 60, the stopper itself, or separate from the stopper 60. A significant advantage of the invention is that the friction sensor 59 is not pulled along with the stylus 37 and probe 9 and does not change the angle of contact of the tip of the stylus 37 and probe 9 as the substrate with test surface moves under the stylus 37 and probe 9. Further, the weight of electrical connections to the friction force sensor 59 do not place weight on the stylus 37 and probe 9 that have to be balanced out with a counterweight 48, nor add friction to the pivotally connected pendulum bar 8. The platform support 15 and thus substrate with test surface 16, moves in such a fashion against the stylus 37 and probe 9 such that the friction force 44 acts against bumper 58, force sensor contact button 62 and/or the friction force sensor 59 and stopper 60. In an embodiment, a removable support may act as an additional support for the substrate with test surface 16, the removable support with substrate with test surface 16 affixed being placed on the platform support 15 and testing being conducted on the substrate with test surface 16 which is affixed to the removable support, the removable support being held in contact to the friction force sensor 59 or the stopper 60 instead of the substrate with test surface 16 by the friction force. The friction force sensor 59 may be any suitable device capable of measuring a linear force such as those based on strain gage technology, piezo technology, compressive load cells, cantilever-based sensors, hydraulic based sensors, pneumatic, piezoelectric crystal, inductive, capacitive, magnetostrictive, resistive, optical, ultrasonic, based.

Figure 6:
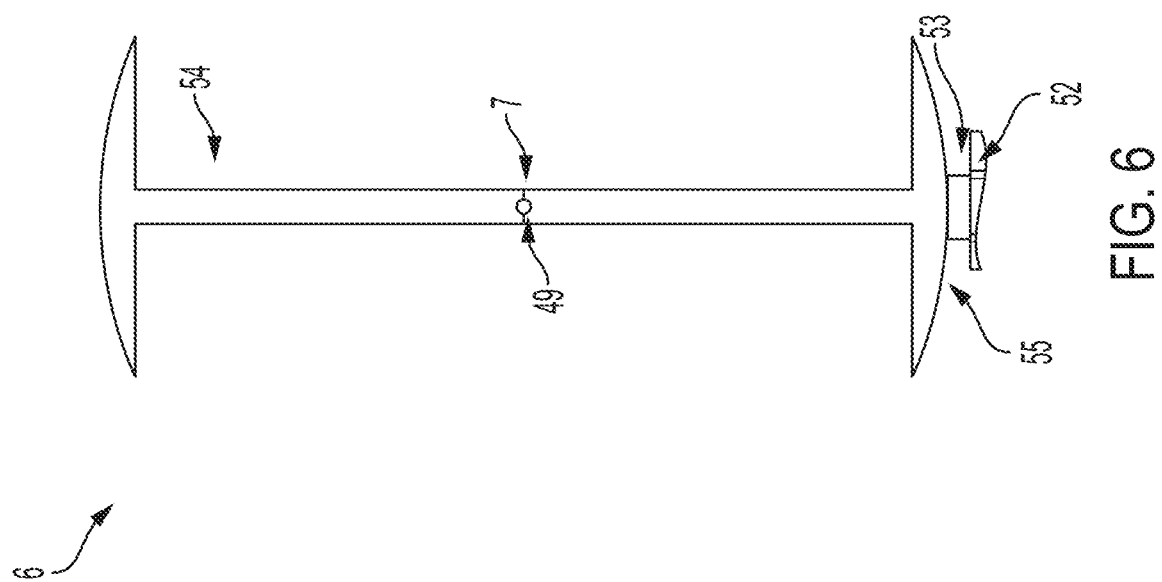
FIG. 6 is an angle sensing device.

The depth of the tip of the stylus 37 and probe 9 before, during, and after a test is determined by use of an angle sensor 6, such as that shown in FIG. 6. One section of angle sensor 6 is affixed to axle 7 and rotates about a radius freely in tandem with axle 7 as axle 7 rotates. The radius of rotation of the section of angle sensor 6 that is affixed to axle 7 is limited only by the distance between the axle and within 1 mm above the face of the bottom portion 53 of the angle sensor 6, and may be any distance between these two lengths. Additionally, the radius of rotation may be increased by increasing the height of the side load bearing members 5 and where the axle 7 is placed along that height. Significant advantages of the invention include, freedom from electrical connections from the moving portions of the sensor which would impose friction and load errors; linear measurement from an angular displacement; increased sensitivity; contactless; submicron sensing capability; z-direction measurement of stylus 37 and probe 9 from an angular displacement; ability to set zero without imposing a static load on the sample; ability to set zero on different portions of the sample irrespective of variations of minor differences of sample surface topology. In one embodiment, the sensor is contactless so as to not impose friction on the system. In one embodiment, the angle sensor is configured as FIG. 6 using an incremental linear sensor. In this manner, a linear measurement is determined from an angular movement about axle 7 and is correlated to a movement of the tip of stylus 37 and probe 9. Referring to FIGS. 3-6, angle sensor 6 is composed of an optical sensor system that utilizes semicircle containing structure 54 attached immovably to axle 7 which freely rotates within bushings or bearings 49 (inclusive of air bearings) set within side load bearing plates 5. In one embodiment the end of the semicircle containing structure 54 is shaped as a semi-circle and is equally balanced about the axle 7 whether through design and/or by use of adjustable weights. In another embodiment, the semicircle containing structure 54 is not balanced about the axle. A sensor head 53 is placed in close proximity (by way of platform 52) to the bottom of the semi-circle shape of the semicircle containing structure 54 to which has been attached a sensor measuring tape 55. In another embodiment the semicircle containing structure may be shaped as an entire circle or as circle with teeth attached as a gear. In one embodiment the sensor may be one which utilizes the imaging, photoelectric measuring principle and a singlefield reflective scanning method. In one embodiment, sensors that meet the criteria include, but are not limited to, exposed linear encoders such as MS15 (RSF Elektronik Ges.m.b.H., Tarsdorf 93, 5121 Tarsdorf, Austria) and LIKgo optical encoder (Numerik Jena GmbH, Im Semmicht 4, 07751, Jena, Germany). In another embodiment, the angular motion is turned into a linear motion by utilization of a gear train. In another embodiment, the angular motion is turned into a linear motion by use of a rack and pinion gearing system. In another embodiment, the angular motion is turned into a linear motion by an interferometer sensing technique. By measuring the actual displacement of the stylus 37 and probe tip 9 in the z-direction 2, the angle sensor 6 measures the depth of the track, scratch, mar, groove, or adhesion created in the surface of the specimen or substrate with test surface 16.

Referring to FIG. 4, as the substrate with test surface 16 moves under the stylus 37 and probe 9 linearly in the x-direction 43, a track, scratch, mar, or groove is created in the substrate with test surface 16. Upon completion of the test, the movement of the substrate with test surface 16 may be stopped by controlling the horizontal drive system 13. Further, the load 4 may be removed from the stylus 37 and probe 9 by controlling the vertical drive motor 11.

Once the test is completed the substrate with test surface 16 may be removed from the substrate support 15 and or removable support for further examination. The test surface may be visually examined or examined with other evaluation instruments including without limitation optical microscopes, flatbed scanners, image capturing tools, cameras, etc. Further, the track, scratch, mar, groove, or adhesion may also be quantified visually or with evaluation instruments. Track/scratch/mar/adhesion/groove depth refers to the vertical distance to be measured from the trough of the track/scratch/mar/adhesion/groove to its peak, or to the undisturbed specimen surface. Track/scratch/mar/adhesion/groove width refers to the horizontal distance between the two peaks on both sides of the track/scratch/mar/adhesion/groove.

A particular advantage of the device disclosed herein is that drying events can be graphed and visualized in real time as well as by mathematical regression techniques posttest. Further, the device allows adhesion results to be evaluated graphically.

Figure 7:
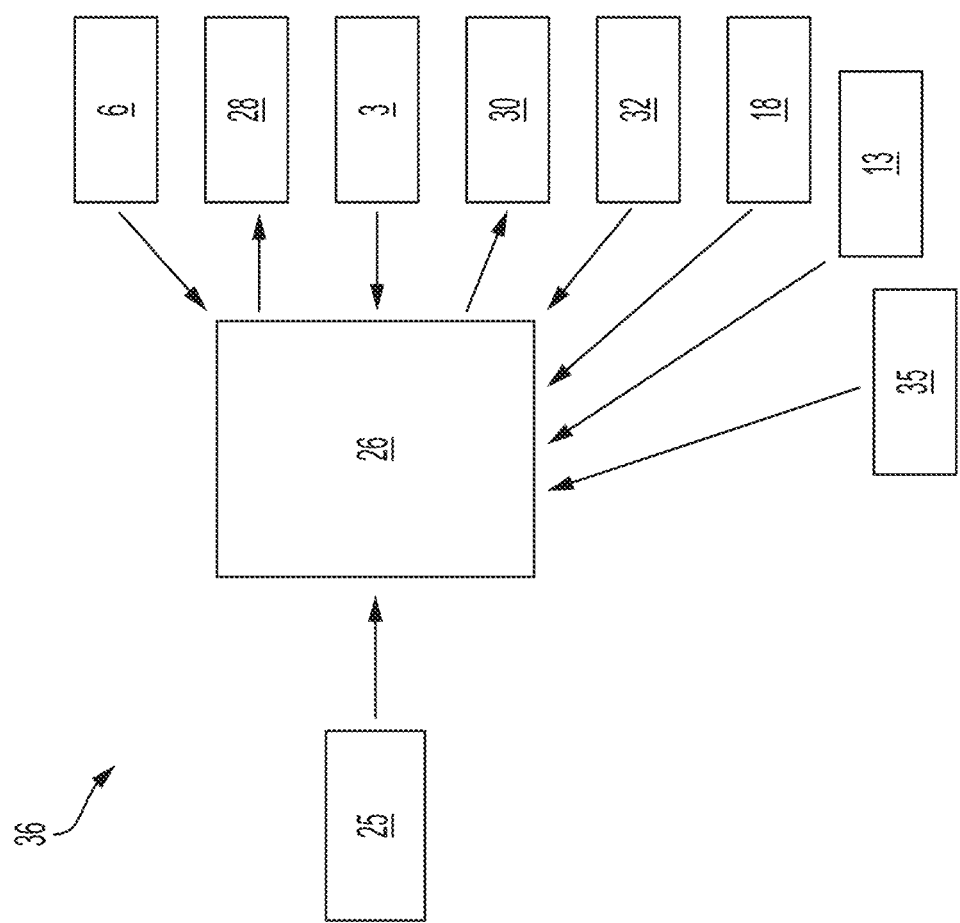
FIG. 7 is a control system used to control a dry, cure, and adhesion testing device.

A control system 36, illustrated in FIG. 7, may be used to control and automate the drying time/adhesion testing device 19, 38, 45, 50, 56 illustrated in FIGS. 1-5. The control system 36 may also be used to control other embodiments of the drying and adhesion testing device.

FIG. 7 illustrates a control system 36 comprising a set of testing parameters 25, a control center 26, load generating device 28, a vertical drive motor 30, horizontal drive system 13, a plurality of drive motor sensors 32, linear position sensors 18, a plurality of other sensors, including, load sensors 3, which also includes horizontal friction sensor, impedance sensor 35, angle sensor 6. In other embodiments additional sensors may be included to measure various test conditions and sample response including without limitation voltage, optical, sonar, acoustic, temperature, drive motor power, amperage, etc.

In some embodiments, a power supply provides power to each of the components of the control system 36. The power supply may be any suitable device or plurality of devices for providing power to the components of the control system 36, including without limitation an electrical power supply, a generator, etc. Further, in certain embodiments, the power supply is built as a separate, enclosed, unit in order to reduce the possibility of electrical interference or noise contamination of the testing data.

In some embodiments, the device may include a transducer configured to examine the movement of the probe. in some embodiments, the transducer may include one or more of an encoder, a sensor, or read head paired with a code position.

Before testing, an operator inputs a set of testing parameters 25 into the control center 26. The set of testing parameters 25 may include, without limitation, the number of drying or adhesion passes, start and end position, start and end time, of the horizontal drive system 34, duration of test, speed, acceleration, direction, rate of the horizontal drive system 34, desired loads, loading rate (whether constant or variable), sampling rates for each sensor, calculations to data, etc. In certain embodiments, the operator may use the angle sensor 27 to set start position or zero of the stylus 37 and probe 9 and then program the control center 26 to initiate horizontal drive system at a given start position, zero or offset; and to initiate a load generating device 28 to initiate at a given start position, zero or offset of horizontal drive system initiation. Setting a low start position for the probe results in reproducibly low test start distances, i.e. the distance the platform moves before the probe contacts the surface, such that the probe will be less than about 15 mm from, less than about 5 mm from, or less than about 2 mm from, or in direct contact with the surface. Setting a low start position for the probe also results in low initial static forces of about 0.1 N or less.

The control center 26 is a computer that runs software designed to control the various functions of the drying and adhesion testing device 19, 38, 45, 50, 56 to capture a set of actual test data during a test, and to provide data processing and analysis capabilities. The software provides the user interface to the control system 36. For example, the operator may use the software to input a set of testing parameters 25 into the control center 26, to initiate the test of interest, to stop the test, and/or to process and analyze the set of actual test data captured during the test. Further, the control center 26 incorporates hardware which interfaces with the plurality of sensors of control system 36. In an embodiment the control center 26 is a programmable logic controller. In an embodiment the control center 26 is a computer. In another embodiment, the control system 36 is a computer and programmable logic controller combination. In an embodiment, the control center 26 offers network connectivity and the ability to save, backup, and share, test data.

Referring to FIGS. 1-7, the control center 26 receives and records a set of actual test data from the plurality of sensors. The set of actual test data includes without limitation the height of the stylus 37 and probe tip 9 from the angle sensor 6, the friction force from the friction force sensor 59, the load data form the load cell sensor 3, extension height 2 of the loading element 1 from a vertical height sensor, the substrate with testing surface 16 location under the stylus 37, speed, acceleration, and direction, velocity from the linear position sensor 18. Further, the control center 26 controls the loading element 1 to adjust the load 4 acting on the stylus 37 and probe 9 and controls the horizontal drive system 13 to control the speed, acceleration, direction, and velocity of substrate with testing surface 16 location under the stylus 37.

The linear position sensor 18 measures and provides the actual location, direction, speed, and acceleration of the substrate with test surface 16 with respect to the stylus 37 and probe 9 to the control center 26. In certain embodiments, the linear position sensor 18 measures the substrate with test surface 16 position within 0.5 microns and measures the actual speed within 0.2 microns/s or less. The angle sensor 6 measures and provides the actual stylus 37 and probe tip 9 z-direction displacement to the control center 26. In certain embodiments, the z-direction displacement of the stylus 37 and probe tip 9 can be measured to within 0.2 microns. The load cell sensor measures and provides the load 4 acting on the pendulum bar 8 and thus the stylus 37 and probe 9 to control center 26. In certain embodiments the load cell sensor measures load 4 to within 2.5 g or less. In certain other embodiments, the load cell sensor 3 may measure load 4 within a range from about 0 to over 30 KN. The linear friction sensor 59 measures and provides the actual friction force acting on the stylus 37 and probe tip 9 to the control center 26. In certain embodiments the friction force sensor 59 measures friction force within 0.05 g or less.

In addition, the control system 36 provides a feedback control loop for the drying time and adhesion testing device 19, 38, 50, 45, 56. The actual test data from the plurality of sensors are constantly and periodically compared to the testing parameters from the control center 26 such that the control system 36 can make adjustments in the vertical drive motor 11 and the horizontal drive system 13 to achieve the desired set of testing parameters 25. For example, by comparing the measured actual load 4 on the pendulum bar 8 and stylus 37 and probe 9 with the desired load, loading rate, loading direction, etc. input from the desired testing parameters 25, the control center 26 may adjust vertical drive motor 11 to consistently achieve the desired load imposed by the loading element 1 and the rate of loading. And by comparing the measured actual location, direction, speed, and acceleration of the substrate with test surface 16 under the stylus 37 and probe 9 with the desired load, loading rate, loading direction, etc. input from the desired location, direction, speed, and acceleration of the testing parameters 25, the control center 26 may adjust the horizontal drive system 13 to consistently achieve the desired location, direction, speed, and acceleration of the substrate with test surface 16 under the stylus 37 and probe 9.

In some embodiments, the drying and adhesion testing device may accommodate a substrate with test surface of almost any thickness simply by increasing the height of side load bearing plates 5 and location of axle 7. Additionally, side load bearing plates 5 with pendulum bar 8, axle 7, and angle sensor 6 are not limited to being strictly attached to base 10, but may be on a separate base raised or lowered relative to base 10, that holds the horizontal drive system 13, substrate support 15 and substrate with test surface 16. Further, loading element support 17 holding loading element 1 may be raised or lowered to accommodate the thickness of the substrate with test surface 16. From a practical standpoint, in certain embodiments, the loading element support 17 can accommodate a sample thickness of about 59 inches and thus samples of this size may be accommodated in the testing device. Further, because control system 36 acts as a feedback control loop, a great variation of permissible geometries of specimens may be tested. The thickness of the substrate with test surface 16 may be constant or variable about the specimen length or width.

The shapes of the substrate with test surface may include without limitation round discs, flat plaques, bars, strips, blocks, cubes tensile bars, impact bars, bricks, cinder blocks, wood panels, etc. Additionally, the drying and adhesion testing device 19, 50, 45, 38, 56 can accommodate substrate with test surface 16 of varying surface texture and or roughness. In certain embodiments, the test surface height may vary greatly beyond the average height because the angle sensor 6 allows easy accommodation by setting start position for measurement start, and because control center 26 utilizes feedback control loop. In this manner, adjustments may be made automatically during testing to compensate for such variations in the geometry of the substrate with test surface 16. Further, by use of control system 36 testing, data recording, data analysis, and data visualization and display may be completely automated once the set of testing parameters 25 has been input by the operator.

Further, as understood by those in the art, in certain embodiments, amplifier units (not illustrated) may be coupled to each sensor, may amplify data signals, and transmit those signals to the control center 26.

The stylus 37 and probe 9 shown in FIGS. 1-5, may be any device capable of producing a track, mark, scratch, groove, mar, etc. in the substrate with testing surface 16. Although the stylus 37 with probe 9 is shown as having an oblong sphere in FIGS. 1 and 3-5, in different embodiments, the stylus 37 with probe 9 may be of any suitable geometry (round, square, loop, point, cylindrical, hook, flat, flat with edge, etc.) Further, the stylus 37 with probe 9 may be composed of any suitable material capable of producing a track, mark, scratch, groove, mar, etc. in substrate with testing surface 16, including without limitation coins, metals, and metal alloys (e.g., steel, iron, aluminum, etc.) and non-metals (composites, plastics, wood, minerals etc.). Still further, the stylus 37 with probe 9 may be hardened, coated, and/or impregnated, or tempered to enhance its hardness, flexibility and or surface properties.

Further, the stylus 37 and probe 9 is removably fixed to the pendulum bar 8. Further, the stylus 37 and probe 9 may be removably fixed to one another. Thus the stylus 37 and or probe 9 may be replaced with a different stylus and different probe of varying geometries, compositions, surface energies, to accommodate a variety of testing conditions and samples. In certain embodiments, the stylus 37 and probe 9 and stylus 37 or probe may be permanently fixed to the pendulum bar 8 or to one another. Further, in another embodiment the pendulum bar 8 may hold multiple stylus 37 and probes 9 or the stylus 37 and probe 9 may be multi-fingered.

In some embodiments, the drying and adhesion testing device 19, 50, 45, 38, 56 may incorporate a climate control chamber in which various environmental conditions, including without limitation temperature and humidity may be controlled during drying and adhesion testing.

In certain embodiments, base 10 provides leveling feet and may provide vibration isolation.

Although the examples to follow describe coatings testing and/or coated substrates, other embodiments of the drying and adhesion testing device may be used to test other materials, including without limitation metals, non-metals, composites films, paints, polymers, road marking, cementitious materials, paper, etc. In particular, the drying and adhesion testing device is especially useful for evaluating and studying drying of polymers, resins, paints, and coatings along with their adhesion to varying substrates as a function of drying. However, it is also especially useful for evaluating and studying materials where cosmetic or surface damage is important such as automotive parts, furniture, durable goods, electronics, packaging, glass, plastics, etc.

While preferred embodiments of this invention have been shown and described, modifications thereof can be made by one skilled in the art without departing from the scope or teaching of this invention. The embodiments described herein are exemplary only and are not limiting. Many variations and modifications of the system and device are possible and are within the scope of the invention. For example, the relative dimensions of various parts, the materials from which the various parts are made, and other parameters can be varied, so long as side loads are alleviated and the device retains the advantages discussed herein. Accordingly, the scope of protection is not limited to the embodiments described herein, but is only limited by the claims that follow, the scope of which shall include all equivalents of the subject matter of the claims. All references cited and/or discussed in this specification are hereby incorporated by reference in their entireties.

The following examples are illustrative, but not limiting, of the methods of the present invention. Other suitable modifications and adaptations of the variety of conditions and parameters normally encountered in the field, and which are obvious to those skilled in the art, are within the spirit and scope of the invention.

EXAMPLES

In the following examples, unless otherwise specified, device 19, shown in FIG. 5, was utilized to conduct testing.

Example 1—Sample Preparation

The sample was prepared by combining 116.36 g Amberlac 3755-X-80 acrylic modified alkyd (Reichhold, Research Triangle Park, N.C.), 0.18 grams Exkin #2 antiskin additive (Huntsman Pigments and Additives), 14.89 g Xylene, 0.38 g Westdry Cobalt 12% (Westbridge Industries, 83 Sycamore Avenue, Freehold, N.J.), 1.85 grams 5% Calcium HEX-CEM (OMG Group, 811 Sharon Drive, Westlake, Ohio), and 0.39 grams Westdry Zirconium 24% (Westbridge Industries, 83 Sycamore Avenue, Freehold, N.J.), in a 600 mL stainless steel Vollrath vessel, equipped with a 1⅝ inch Cowles blade, under agitation. This was followed by addition of 45.95 g Xylene. The sample was mixed for 30 mins at 800 rpm, and stored in a glass jar until further use.

Example 2—Drying of the Sample (at Test Rate of 0.002 mm/s)

To assess the drying of the Sample of Example 1, the Sample was drawn down onto a 9 inches long, by 6 inches wide ¼ inch thick plate glass substrate 40, using a 6 mil bird bar having a length of 7.5 inches and a gap width of 6 inches (BYK-Gardner USA, 9104 Guilford Rd, Columbia, Md.). The drawdown was made such that the width of the bird bar runs parallel to the 9 inch dimension of the plate glass substrate 40. The time of the drawdown was noted.

Immediately after the drawdown, the plate glass substrate 40 with wet film 39 was moved to the substrate support platform 15 of the testing device equipped with a 9.58 mm diameter by 23 mm long stainless steel stylus 37 and probe 9 wherein the probe is a 9.5 mm diameter ball composed of Teflon, as illustrated in FIG. 1 for example. The Teflon probe is attached to the stylus 37 by way of a 3.22 mm metal rod wherein one end inserts into the Teflon probe and the other into a hole in the end of the stylus 37 and locked with a set screw. The coated substrate 40 was placed against a stopper 60 located on the substrate support platform 15. The probe 9 was manually adjusted to about 5 mm above the surface of the film 39 such that the center of the ball is about 10 mm from the edge of the drawdown. Φ 42 of the probe was between 45 degrees to normal.

A drying test was initiated by starting the horizontal drive system 13 which moved the substrate horizontal with test surface 16 at a rate of 0.002 mm/s simultaneous to dynamically loading a controlled constant load of 10 g onto the pendulum bar 8 and thus stylus 37 and probe 9 at a loading rate of 5 mm/min. The substrate with test coating 39 was allowed to move under the stylus 37 and probe for a distance of 140 mm and for a rough duration of 20 hours, under a dynamically controlled constant load of 10 g.

Figure 8:
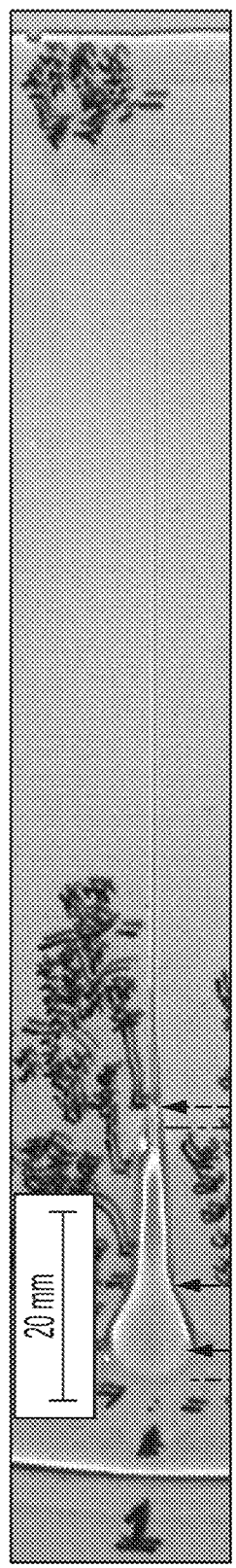
FIG. 8 is an image displaying a drying track of a 6 mil liquid film solvent-based alkyd coating from a dry, cure, and adhesion testing device of FIG. 5, wherein testing was performed over a period of roughly 20 hours.
Figure 9:
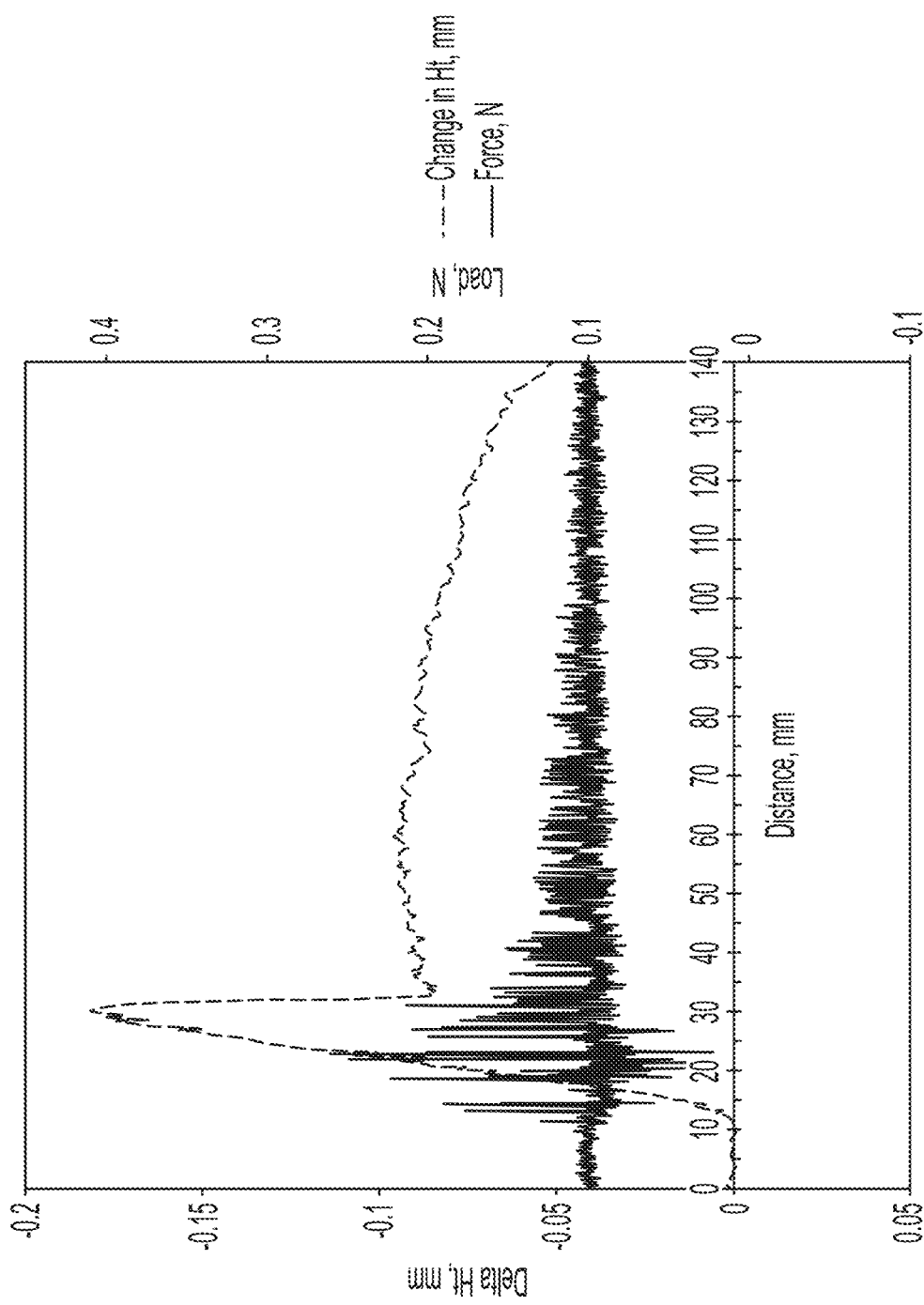
FIG. 9 illustrates a drying measurement of the drying of the solvent based alkyd formulation of FIG. 8, demonstrating measured drying events of the 6 mil liquid film as a function of distance.
Figure 10:
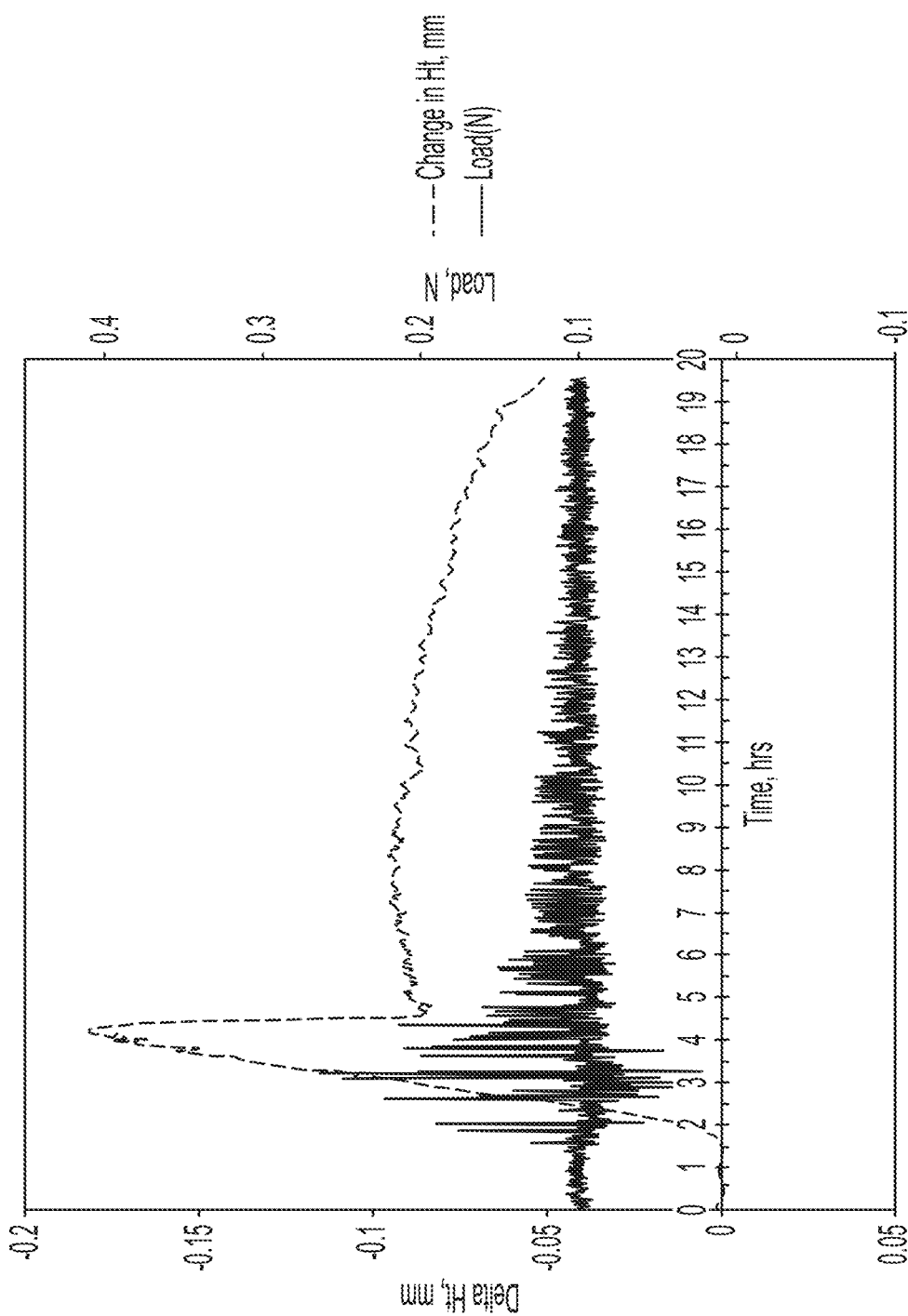
FIG. 10 illustrates a drying measurement of the drying of the solvent based alkyd formulation of FIG. 8, demonstrating measured drying events of the 6 mil liquid film as a function of time.

FIG. 8 illustrates the visual results of the probe's interaction with the sample of Example 1. FIG. 9 illustrates graphically the interaction of the probe with the sample by monitoring the change in z-height of the loading element 1 (utilizing an absolute multitum rotary encoder sensor coupled to vertical drive motor 11) associated with dynamically controlling load 4 to a constant value of 10 g, and oscillation, fluctuation, and undulation of the dynamically controlled load as the control center works to maintain the target load, both as a function of distance. FIG. 10 shows the same result as FIG. 9 but as a function of time. FIG. 8 shows that a mid-point of a pear shape appears at about 6.4 mm (thick black arrow, FIG. 8) and is completely dissipated at about 13.3 mm (thin black dashed arrow, FIG. 8). It is believed that as the film dries, the film builds up in front of the probe. When the film has dried sufficiently, the film will resist being pushed by the probe and force the probe to rise in height over the build-up of film in front of the probe. FIG. 9 confirms that the film has reached a point that the pear shape has disappeared because of sample drying and the probe begins to rise between about 11.6 and about 13 mm. The film will continue to dry until such time that it is not sticky any longer and will not build up due to plowing by the probe, at which point the height of the probe will drop dramatically. The probe reaches a peak height at about 30.3 mm (thin black dotted line, FIG. 8) and drops to the other side of the peak at about 32.4 mm (thick white arrow, FIG. 8). 32.4 mm is the end of the "v" groove in FIG. 8.

Not being limited by theory, it is believed that the time represented by the 32.4 mm distance is the "dry-hard" time defined in ASTM D5895, about 4.6 hours according to FIG. 10, while the time represented by the 11.6 mm to 13 mm distance may represent the "Set-To-Touch", about 1.6 hours to about 1.7 hours according to FIG. 10. This may also be the time at which the sample reaches an equilibrium of between a more liquid-like nature and a more solid-like nature, the so called "Sol-Gel" time.

Each change of slope in the delta height curve represents a drying event and may be further defined by taking the $1^{st}$ or $2^{nd}$ derivative of the delta height curve. As can be seen, the invention results in sharply defined drying event times and/or distances, even for a clear film. After approximately 32.4 mm, (about 4.6 hours), the change in height of the probe is believed to be due to the probe mostly being on the surface of the film and film shrinking.

Example 3—Drying of the Sample (at Test Rate of 0.021 mm/s)

To assess the drying of the Sample of Example 1, the Sample was drawn down onto a 9 inches long, by 6 inches wide ¼ inch thick plate glass substrate 40, using a 6 mil bird bar having a length of 7.5 inches and a gap width of 6 inches (BYK-Gardner USA, 9104 Guilford Rd, Columbia, Md.). The drawdown was made such that the width of the bird bar runs parallel to the 9 inch dimension of the plate glass substrate 40. The time of the drawdown was noted.

Immediately after drawdown, the plate glass substrate 40 with wet film 39 was moved to the substrate support platform 15 of the drying and adhesion testing device equipped with a stylus 37 and probe 9 wherein the probe is a 9.5 mm diameter ball composed of Teflon as described in Example 2. The substrate 40 with wet film 39 having a test surface 16 was placed against a stopper 60 located on the substrate support platform 15. The probe 9 was manually adjusted to about 5 mm above the surface of the film 39 such that the center of the ball is about 10 mm from the edge of the drawdown.

A drying test was initiated by starting the horizontal drive system 13 which moved the substrate with test surface 16 at a rate of 0.021 mm/s simultaneous to dynamically loading a controlled constant load of 10 g onto the pendulum bar 8 and thus stylus 37 and probe 9 at a loading rate of 5 mm/min. The substrate with test coating 39 was allowed to move under the stylus 37 and probe for a distance of about 140 mm or for a duration of roughly 2 hours under a dynamically controlled constant load of 10 g.

Figure 11:
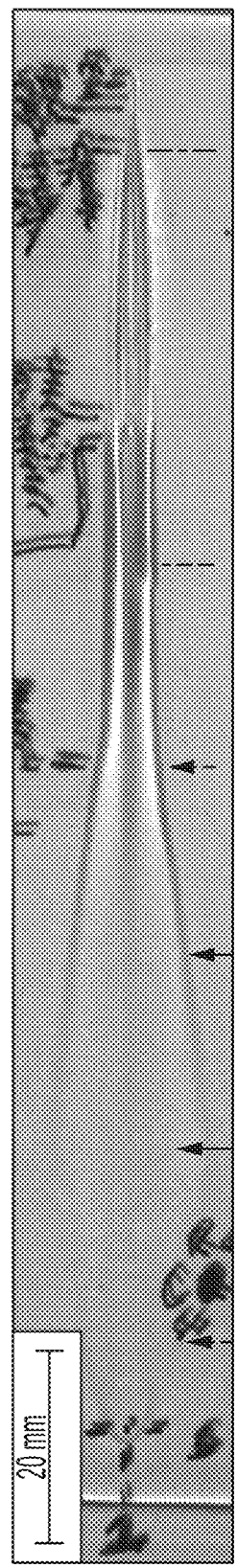
FIG. 11 illustrates an image displaying a drying track of a 6 mil liquid film solvent-based alkyd coating from a dry, cure, and adhesion testing device of FIG. 5, wherein testing was performed over a period of roughly 2 hours.
Figure 12:
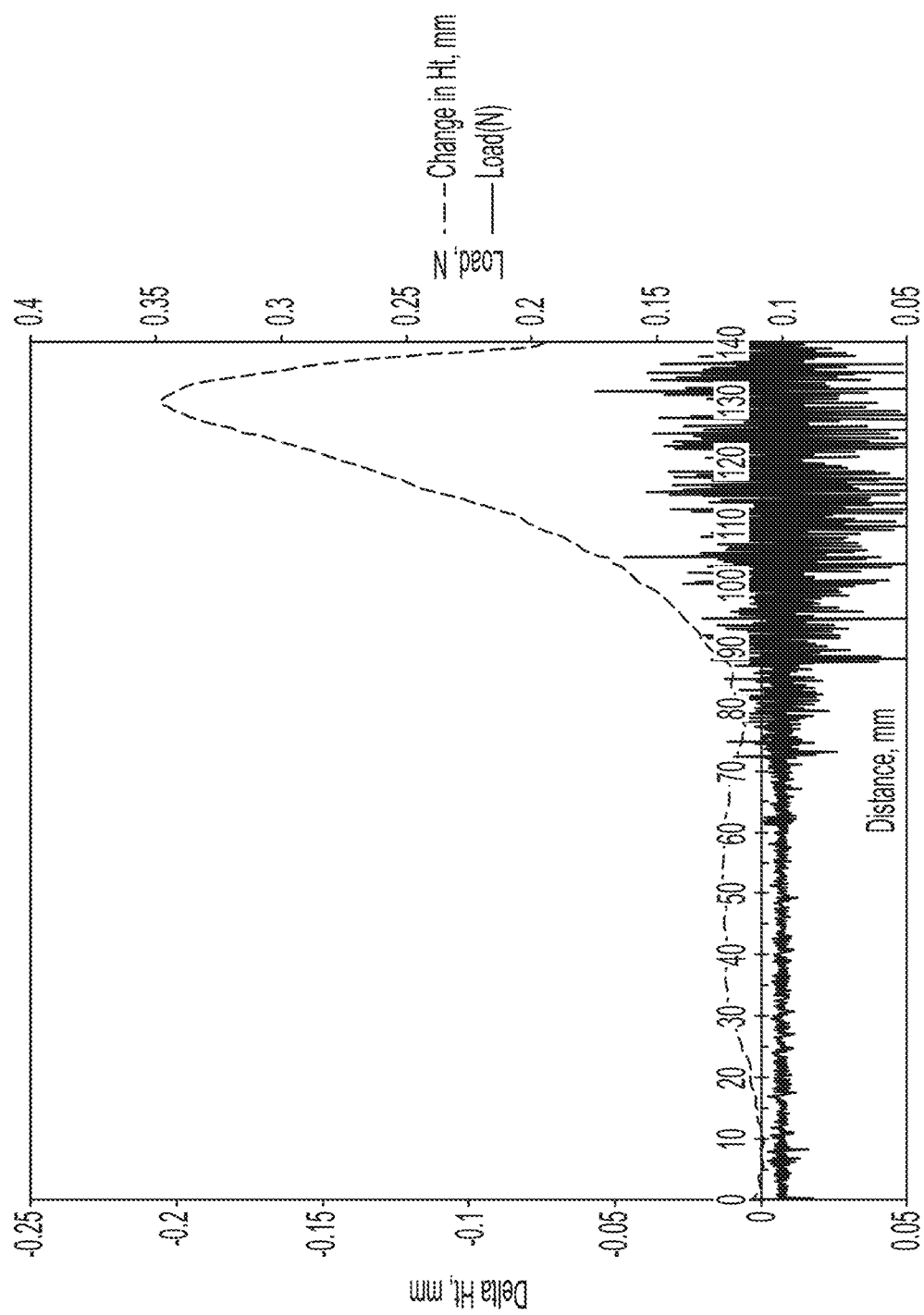
FIG. 12 illustrates a drying measurement of the drying of the solvent-based alkyd formulation demonstrating measured drying events of the 6 mil liquid film as a function of distance shown in FIG. 11.
Figure 13:
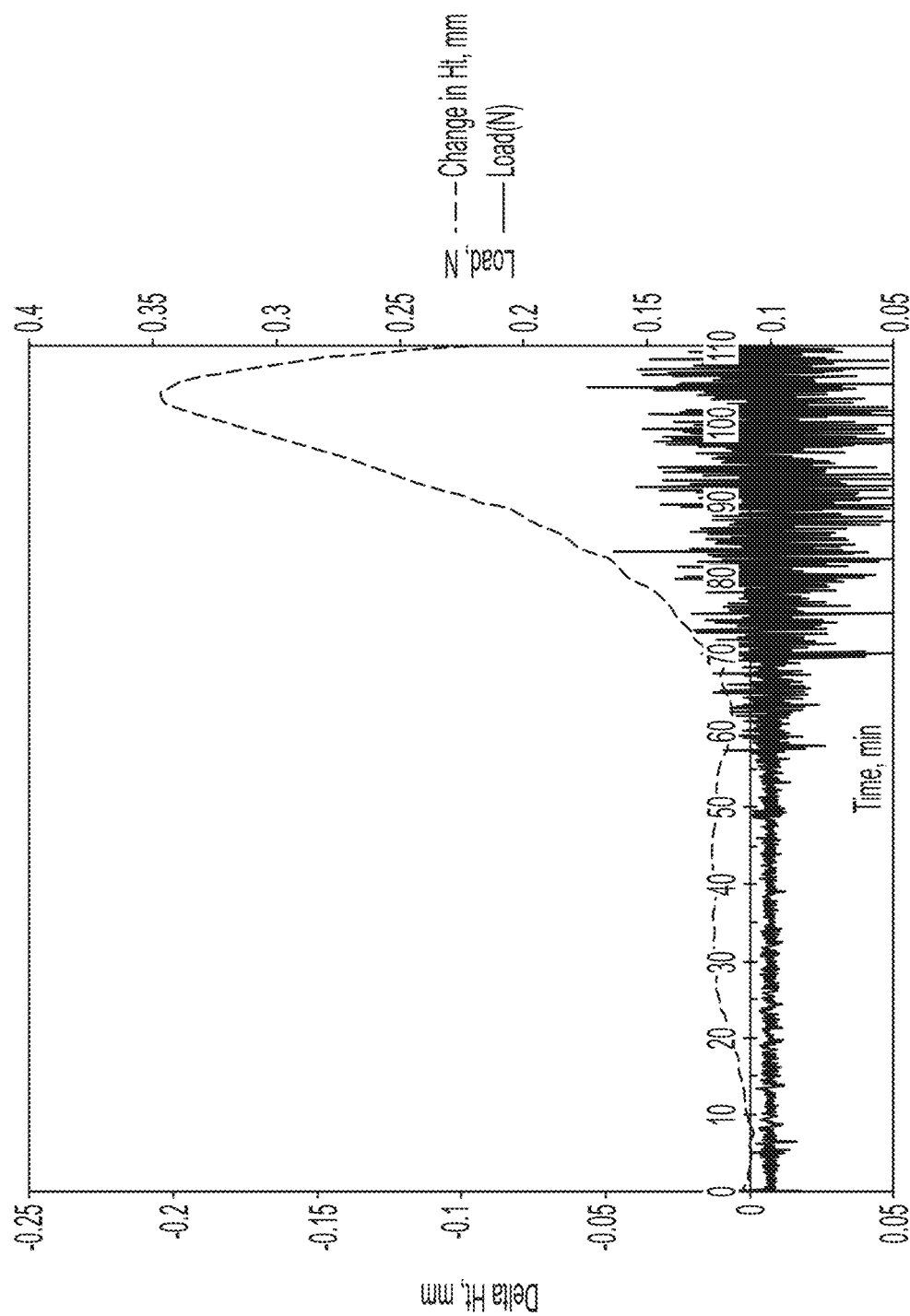
FIG. 13 illustrates a drying measurement of the drying of the solvent-based alkyd formulation demonstrating measured drying events of the 6 mil liquid film as a function of distance time in FIG. 11.
Figure 14:
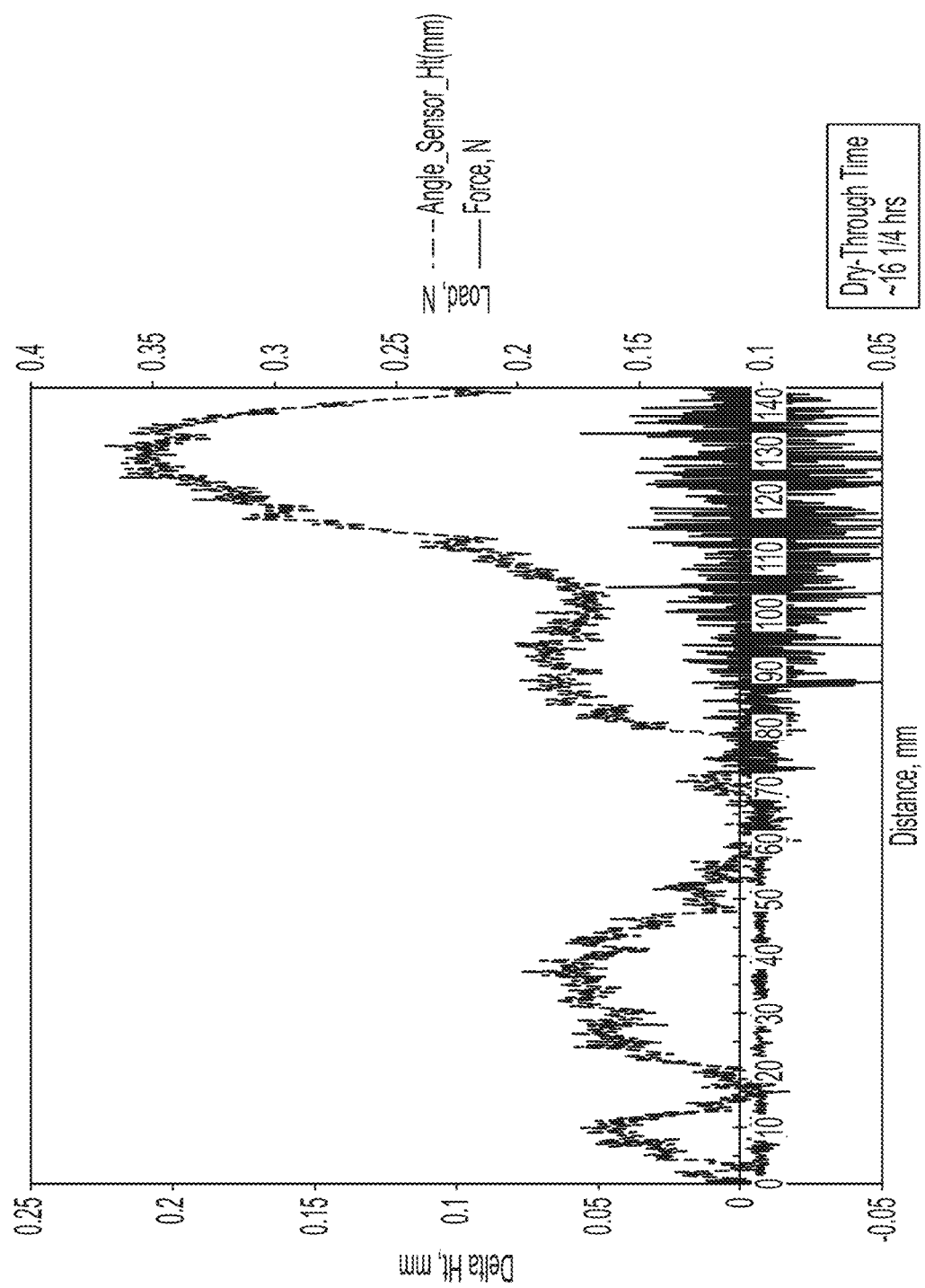
FIG. 14 illustrates a drying measurement of the drying of the solvent based alkyd formulation demonstrating measured drying events of the 6 mil liquid film as a function of distance shown in FIG. 11 using an angle sensor.

FIG. 11 illustrates the visual results of the probe's interaction with the sample of Example 1. FIG. 12 illustrates graphically the interaction of the probe with the sample by monitoring the change in z-height of the loading element 1 (utilizing an absolute multiturn rotary encoder sensor coupled to vertical drive motor 11) associated with dynamically controlling load 4 to a constant value of 10 g, and oscillation, fluctuation, and undulation of the dynamically controlled load as the control center works to maintain the target load, both as a function of distance. FIG. 13 shows the same result as FIG. 12 but as a function of time. FIG. 14 shows the same result as FIG. 12 but utilizing change in height from angle sensor 6, also as a function of distance. Before the test was initiated angle sensor 6 was calibrated for height at the probe. Not being bound by theory, referring to FIG. 11, it is seen that at about 10 mm (thick white arrow, FIG. 11), the track widens from its initial width which is displayed in FIG. 12 as a rise in probe height, perhaps due to the probe riding up due to flowing liquid film underneath the probe. FIG. 11 shows that the drying track reaches a maximum width at about 20-30 mm (thick black arrow in FIG. 11 represents about 30 mm), beginning to narrow again even more at about 50 mm (thin black dashed arrow, FIG. 11). FIG. 12 shows again that the probe reaches an approximate maximum height for this drying event close to 50 mm and the inflection of the curve begins to drop off again at about after this. FIG. 11 shows that at about 70 mm (thin white dashed arrow, FIG. 11) there is a dramatic change in the appearance of the drying track with the appearance of a deeper groove in the track. FIG. 12 shows a significant change in the probe height in the 70-75 mm area. It is believed that the time represented by 50 mm distance is the "Set-To-Touch" time (e.g., about 40 minutes) as defined by ASTM D5895. Referring to FIG. 11 again, it is seen that at about 133 mm (thin black dotted line, FIG. 11) there is a transition of appearance of the drying track from that of leaving a groove to beginning to cut the drying film before the test is ended. This position is represented by a change in peak height maximum in FIG. 12. At about 90 mm (approximately 70 minutes) it is seen that the probe height begins to rise significantly, indicating another significant drying event, perhaps the "Tack-Free" time as defined by ASTM D5895. Similar results and conclusions are drawn from FIGS. 13 and 14. (White dotted line in FIG. 11 is approximately 90 mm).

Example 4—Drying of a Paint Sample

Commercial interior latex paint, Promar 200, Egg-Shell, product number 6508-65017 (The Sherwin-Williams Company, Cleveland, Ohio), was drawn down onto a 9 inch long, by 6 inch wide ¼ inch thick plate glass substrate 40, using a 6 mil bird bar having a length of 7.5 inches and a gap width of 6 inches (BYK-Gardner USA, 9104 Guilford Rd, Columbia, Md.). The drawdown was made such that the width of the bird bar runs parallel to the 9 inch dimension of the plate glass substrate 40. The time of the drawdown was noted.

Immediately after casting the film 39, the plate glass substrate 40 with wet film 39 was moved to the substrate support platform 15 of the drying and adhesion testing device equipped with a stylus 37 and probe 9 wherein the probe is a 9.5 mm diameter ball composed of Teflon as described in Example 2. The substrate 40 with wet film 39 having a test surface 16 was placed against a stopper 60 located on the substrate support platform 15. The probe 9 was manually adjusted to about 5 mm above the surface of the film 39 such that the center of the ball is about 10 mm from the edge of the drawdown.

A drying test was initiated by starting the horizontal drive system 13 which moved the substrate with test surface 16 at a rate of 0.021 min/s simultaneous to dynamically loading a controlled constant load of 10 g onto the pendulum bar 8 and thus stylus 37 and probe 9 at a loading rate of 5 mm/min. The substrate with test coating 39 was allowed to move under the stylus 37 and probe for a distance of about 140 mm or for a duration of roughly 2 hours under a dynamically controlled constant load of 10 g.

Figure 15:
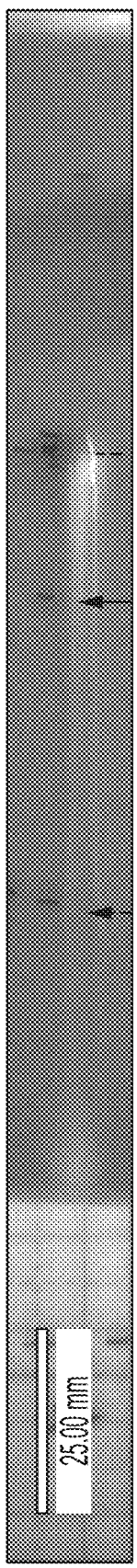
FIG. 15 illustrates an image displaying a drying track of a 6 mil liquid film of a commercial latex paint from the dry, cure, and adhesion testing device of FIG. 5, wherein testing was performed over a period of roughly 2 hours.
Figure 16:
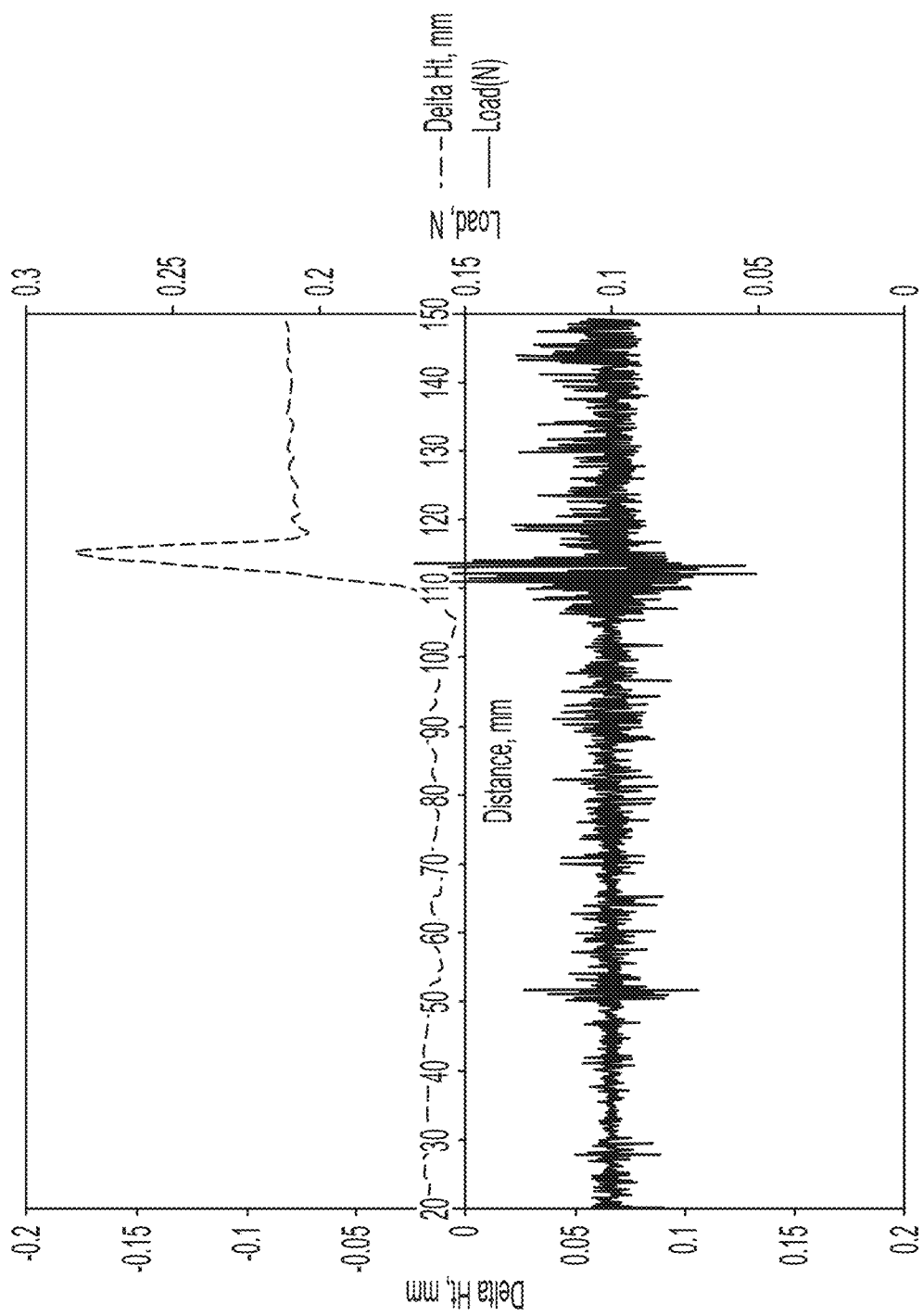
FIG. 16 illustrates a drying measurement of the drying of the commercial latex paint demonstrating measured drying events of the 6 mil liquid film as a function of distance shown in FIG. 14.

FIG. 15 illustrates the visual results of the probe's interaction with the paint sample. FIG. 16 illustrates graphically the interaction of the probe with the sample by monitoring the change in z-height of the loading element 1 (utilizing an absolute multiturn rotary encoder sensor coupled to vertical drive motor 11) associated with dynamically controlling load 4 to a constant value of 10 g, and oscillation, fluctuation, and undulation of the dynamically controlled load as the control center works to maintain the target load, both as a function of distance. Not being bound by theory, referring to FIG. 15, it is seen that at about 55-60 mm from zero start (about 25 minutes drying time; thick white line in FIG. 15 is approximately 60 mm), the track begins to narrow significantly. This can be seen in FIG. 16 in the shift of the delta height curve at this point (approximately 52-55 mm). That a significant drying event has occurred is confirmed by the undulation of the load at this point as well. (Note, the difference between the two values could be due to errors in marking zero on the figure and hence in measuring distances on the figure). It is believed that the time represented by this distance is the "Set-To-Touch" time (e.g., about 25 minutes) as defined by ASTM D5895. Referring to FIG. 15 again, it is seen that at about 100 mm, (thick black line, FIG. 15), there is a transition of appearance of the drying track from that of leaving a groove to cutting approximately to the glass substrate. This position is represented by a change in slope in the Delta Ht curve of FIG. 16. It is believed that the time represented by this distance is the "Tack-Free" time (e.g., about 60 minutes) as defined by ASTM D5895. The next major drying event displayed by FIG. 16 occurs in the range of 110-120 mm, and exhibits itself as a peak in the Delta Ht curve. The time represented by the 120 mm distance (e.g., roughly 78 minutes; thin white dashed line, FIG. 15) is believed to represent the "Dry-Hard" time as defined by ASTM D5895. After this, the probe rides along the surface of the film where any change in height will be due to further drying and film shrinkage.

Example 5—Printing Test of the Sample

To assess the print resistance of the Sample of Example 1, the Sample was drawn down onto a 9 inches long, by 6 inches wide ¼ inch thick plate glass substrate 40, using a 6 mil bird bar having a length of 7.5 inches and a gap width of 6 inches (BYK-Gardner USA, 9104 Guilford Rd, Columbia, Md.). The drawdown was made such that the width of the bird bar runs parallel to the 9 inch dimension of the plate glass substrate 40. The time of the drawdown was noted.

The film was allowed to dry at atmospheric conditions for 100.26 hrs. The film 39 on the plate glass substrate 40 was moved to the substrate support platform 15 of the drying and adhesion testing device equipped with a stylus 37 and probe wherein the probe was a plastic wheel with axle. The wheel was made out of polylactic acid polymer having a radius of 25 mm and a contact face of 12 mm wide. The device was also equipped with angle sensor 6 attached to axle 7. The substrate with test surface 16 was placed against a stopper 60 located on the substrate support platform 15. A strip of army duck fabric approximately 20 mm width by 180 mm length was gently placed onto the surface 16 of the film 39. The probe was manually touched to the surface of the fabric. Touching the probe to the surface of the fabric on top of the film gives the height of the fabric and film by way of angle sensor 6. This angle and/or height is stored in the program parameters such that the test will automatically initiate upon the probe reaching this height. The probe was then manually adjusted to about 5 mm above the surface of the fabric and film.

A print test was initiated by starting the vertical drive motor 11 and dynamically loading a controlled variable load from 0.1 N to 10.0 N onto the pendulum bar 8 and thus stylus 37 and probe 9 at an initial loading rate of 5 mm/min. The rate of load during the test is controlled to meet the programed parameters which depend upon total final target load, horizontal platform speed, and test distance. The horizontal drive system 13 automatically initiates when the probe reaches the "stored surface height of the sample," as determined by the angle sensor 6, and moved the substrate with test surface 16 at a rate of 0.250 mm/s under the stylus 37 and probe 9 for a distance of about 140 mm. The sample was found to not imprint the texture of the fabric into the film until a load of 1.00 N was reached.

Example 6—Adhesion Test of the Sample

To assess the adhesion properties of the Sample of Example 1, the Sample was drawn down onto a 9 inches long, by 6 inches wide ¼ inch thick plate glass substrate 40, using a 6 mil bird bar having a length of 7.5 inches and a gap width of 6 inches (BYK-Gardner USA, 9104 Guilford Rd, Columbia, Md.). The drawdown was made such that the width of the bird bar runs parallel to the 9 inch dimension of the plate glass substrate 40. The time of the drawdown was noted.

The film was allowed to dry at atmospheric conditions for 23.99 hours, resulting in a tender film that had reached a dry hard state, but was not fully cured. Hence a tender film is still tender and can be damaged easily. The film 39 on the plate glass substrate 40 was moved to the substrate support platform 15 of the drying and adhesion testing device equipped with a stylus 37 and probe 9, wherein the probe is a hardened steel rod of 1.58 mm diameter shaped into a u-shaped loop. The loop is shaped such that the outside legs of the "U" shape are about 6.61 mm from outside leg to outside leg. The device is also equipped with angle sensor 6 attached to axle 7. The substrate 40 with test surface 16 was placed against a stopper 60 located on the substrate support platform 15. The probe was manually touched to the surface of the tender film. (In some cases, a piece of parchment paper may be overlaid onto the film if it is extremely tender to forces less than 10 g.) Touching the probe to the surface of the film or film and parchment paper gave the height of the film by way of angle sensor 6. This angle and/or height was stored in the program parameters such that the test was automatically initiated upon the probe reaching this height or an offset height. The probe was then manually adjusted to about 5 mm above the surface of the film such that the loop is about 5 mm from the edge of the drawdown.

An adhesion test was initiated by starting the vertical drive motor 11 and dynamically loading a controlled variable load from 0.1 N to 50.0 N onto the pendulum bar 8 and thus stylus 37 and probe 9 at an initial loading rate of 5 mm/min. The rate of load during the test was controlled to meet the programed parameters which depend upon total final target load, horizontal platform speed, and test distance. The horizontal drive system 13 automatically initiates when the probe reaches the "stored surface height of the sample, or programmed offset" as determined by the angle sensor, and moved the substrate with test surface 16 at a rate of 12.7 mm/s under the stylus 37 and probe 9 for a distance of about 130 mm. The test was repeated in triplicate, each time storing the surface height of the sample for test start.

Figure 17:
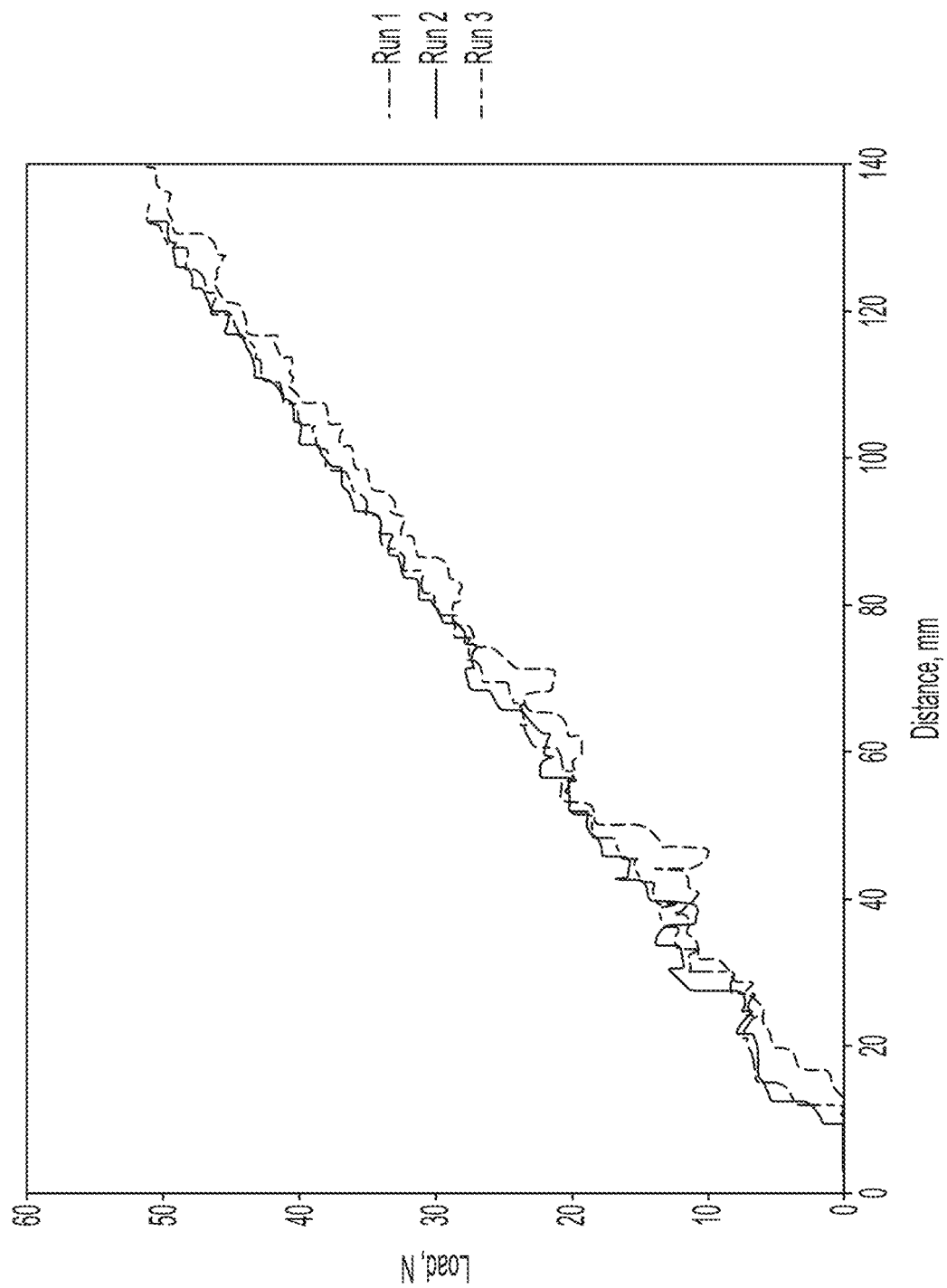
FIG. 17 illustrates a graph of adhesion force in terms of normal force verses distance for a solvent based alkyd on glass wherein measurement was repeated in triplicate.

Table 1 details the initial platform distance from zero before load was detected on the sample, the initial load detected by the sample, and the average load at various failure points of the sample. The data indicates an average test start distance of 6.30 mm with a standard deviation of 3.89 mm. The data also indicates an average test start load of 0.08 N, with standard deviation of 0.13 N. FIG. 17 graphically displays the testing results. The data indicates reproducible test start distances, reproducible failure loads, and low static force imposed on the sample. Alleviation of static forces is very important for sensitive samples such as those exemplified by Example 1.

TABLE 1

Repeatability and Testing Result Data Using Angle Sensor and Loop Probe

| Test Run | Test Start Distance, mm | Test Start Force, N | Scratch Resistance Load, N | Cracking Resistance Load, N | Film Removal Load, N | Total Removal to Glass Substrate Load, N |
|---|---|---|---|---|---|---|
| 1 | 10.69 | 0.23 | 3.72 | 6.89 | 10.86 | 27.52 |
| 2 | 3.28 | 0.00 | 5.43 | 6.48 | 12.10 | 25.93 |
| 3 | 4.92 | 0.00 | 4.43 | 7.12 | 11.34 | 22.98 |
| Average | 6.30 | 0.08 | 4.53 | 6.83 | 11.43 | 25.48 |
| Standard Deviation | 3.89 | 0.13 | 0.86 | 0.32 | 0.63 | 2.30 |
| Coefficient of Variation, % | | | 18.99 | 4.74 | 5.50 | 9.03 |

Example 7—Multi-Surface Adhesion Test

Several wood finished panels with different commercial coating systems were evaluated for adhesion. The panels and coatings systems are designated as follows: Acid cure varnish system #1 on solid maple wood; acid cure varnish system #2 on solid maple wood; commercial solvent-based precatalyzed lacquer (The Sherwin-Williams Company, Cleveland, Ohio) on maple veneer; and 100% solids UV coating system on maple veneer.

The individual finished panels were evaluated for adhesion as follows: each panel was individually moved to the substrate support platform 15 of the drying and adhesion testing device equipped with a stylus 37 and probe 9 wherein the probe is a hardened steel rod of 1.58 mm diameter shaped into a u-shaped loop. The loop is shaped such that the outside legs of the "U" shape are about 6.61 mm from outside leg to outside leg. The substrate 40 with test surface 16 was placed against a stopper 60 located on the substrate support platform 15. The probe was adjusted adjacent to the test surface with the use of a stage on which is mounted a momentary switch that activates the device when the switch is engaged. The switch may be electrical, pneumatic, magnetic, or a plunger sensor which utilizes the imaging, photoelectric measuring principle and a singlefield reflective scanning method. The probe was then manually adjusted to about 5 mm above the surface of the film such that the loop will be sure to contact the test surface.

An adhesion test was initiated by starting vertical drive motor 11 and dynamically loading a controlled variable load from 0.1 N to 110.0 N onto the pendulum bar 8 and thus stylus 37 and probe 9 at an initiation loading rate of 5 mm/min. The rate of load during the test is controlled to meet the programed parameters which depend upon total final target load, horizontal platform speed, and test distance. The horizontal drive system 13 automatically initiates when the probe activates the momentary switch and moves the substrate with test surface 16 at a rate of 12.7 minis under the stylus 37 and probe 9 for a distance of about 130 mm. The test was repeated several times.

Figure 18:
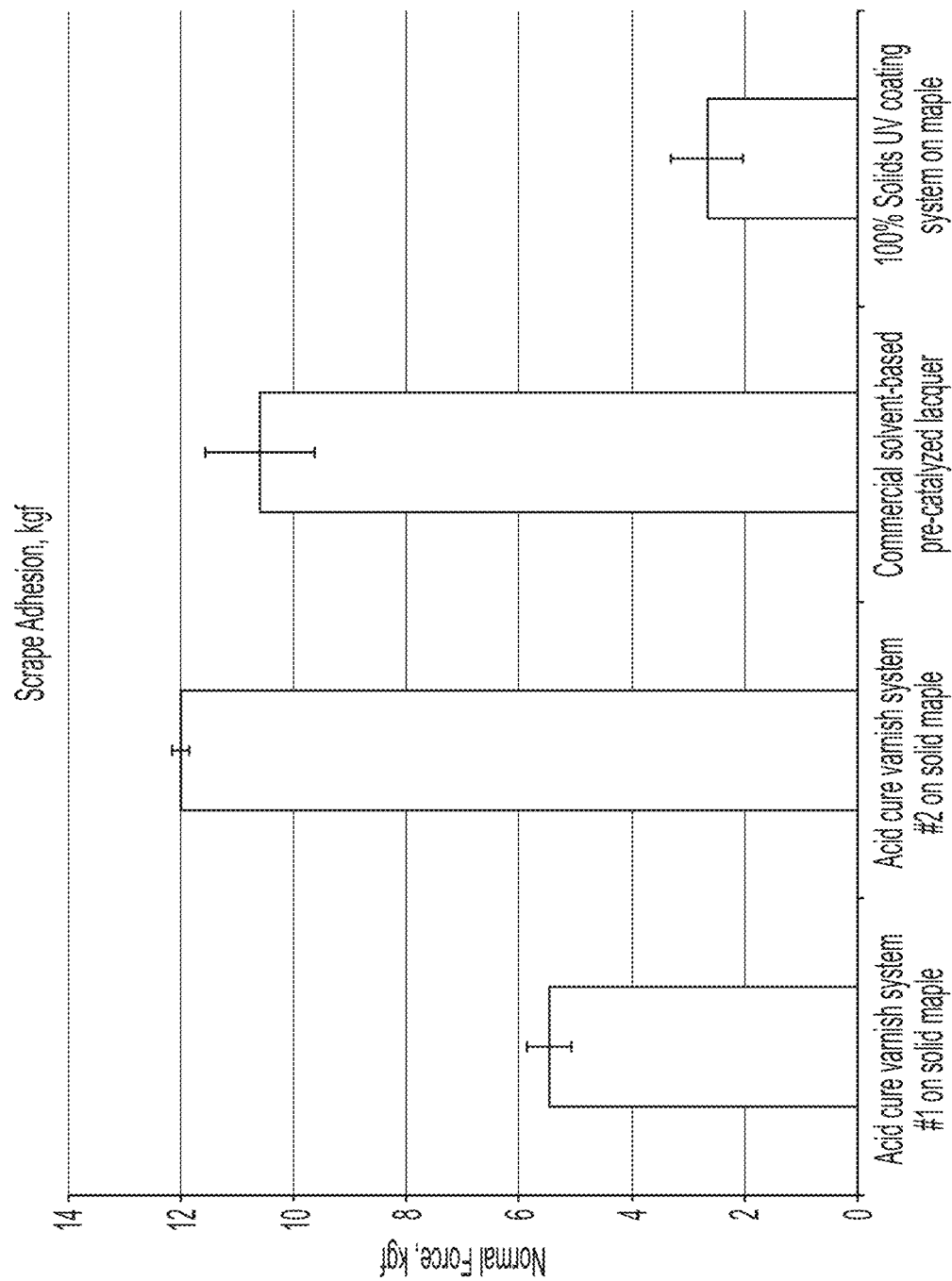
FIG. 18 illustrates a bar graph of the normal force load to failure for scrape adhesion of various coating systems on wood substrates. The number of runs and respective coefficient of variation for the testing is as follows: for Acid cure varnish system #1 on solid maple, n=12, COV=7.3%; for Acid cure varnish system #2 on solid maple, n=3, COV=1.3%; for the 100% solids UV coating system on maple veneer, n=5, COV=24.4, and for the commercial solvent-based pre-catalyzed lacquer on maple veneer, n=5, COV=9.1%. Error bars are ±standard deviation for each measurement result.

FIG. 18 display the adhesion results obtained. FIG. 18 shows that good reproducibility can be obtained with the device for a given sample. The data also shows that statistically different results are obtained for the samples. Further the data shows that best adhesion is obtained with the acid cure varnish system #2 on solid maple while the worst adhesion is obtained for the 100% solids UV coating system on maple veneer.

Example 8—Adhesion and Friction Test of Coated Vs Uncoated Panels

Several ¾ inch thick hard maple plywood panels finished with a self-crosslinking water-based acrylic polymer coating system, the polymer, having an approximate minimum film formation temperature of about 25° C., were evaluated for adhesion and friction force versus an uncoated panel.

The panels and coatings systems are designated as follows: Blank Panel, sanded with 100 grit sand paper, 150 grit sand paper, and 180 grit sand paper, in that order; WB/3.5% Lanco TF 1778, indicating that the water-based acrylic polymer coating was modified with 3.5% Lanco TF 1778, a micronized PTFE modified polyethylene wax (Lubrizol Corporation, 9911 Brecksville Road, Brecksville, Ohio 44141 USA); WB/3.5% Ceridust 9610 F, indicating that the water-based acrylic polymer coating was modified with 3.5% Ceridust 9610 F, a micronized Polyethylene wax modified with Polytetrafluorethylene (Clariant Plastics & Coatings, 4000 Monroe Rd, Charlotte, N.C. 28205); and WB/Clear/No wax, indicating that the water-based polymer was not modified with any wax. Each water-based formulation was maintained at equivalent volume solids, approximately 31% by volume. The water-based coatings were applied to the wood substrate by spray application in two passes, wet on dry. The finished panels were allowed to age approximately 21 months.

The individual finished panels as well as the unfinished panel, were evaluated for adhesion and friction force as follows: each panel was moved to the frictionless substrate support 57 of the drying and adhesion testing device equipped with a stylus 37 and probe 9 wherein the probe 9 is a hardened steel rod of 1.58 mm diameter shaped into a u-shaped loop. The loop is shaped such that the outside legs of the "U" shape are about 6.61 mm from outside leg to outside leg. The substrate with test surface was placed against a moveable bumper 58, force sensor contact button 62, friction/force sensor 59, and anchored stopper 60 located on the substrate support platform 15 in the configuration of the dry, cure, and adhesion testing device 56, as shown in FIG. 19.

The probe was manually touched to the surface of the test surface. Touching the probe to the surface of the test surface gives the height of the surface by way of angle sensor 6. This angle and/or height is stored in the program parameters such that the test will be automatically initiated upon the probe reaching this height or an offset height. The probe was then manually adjusted to about 5 mm above the surface of the test surface such that the loop will be sure to contact the test surface. The friction force sensor 59 was zeroed. An adhesion test was initiated by starting vertical drive motor 11 and dynamically loading a controlled variable load from 0.1 N to 110.0 N onto the pendulum bar 8 and thus stylus 37 and probe 9 at an initiation loading rate of 5 mm/min. The rate of load during the test is controlled to meet the programed parameters which depend upon total final target load, horizontal platform speed, and test distance. The horizontal drive system 13 automatically initiates when the probe reaches the "stored surface height of the sample, or programmed offset" as determined by the angle sensor, and moved the substrate with test surface 16 at a rate of 12.7 mm/s under the stylus 37 and probe 9 for a distance of about 110 mm.

Figure 19:
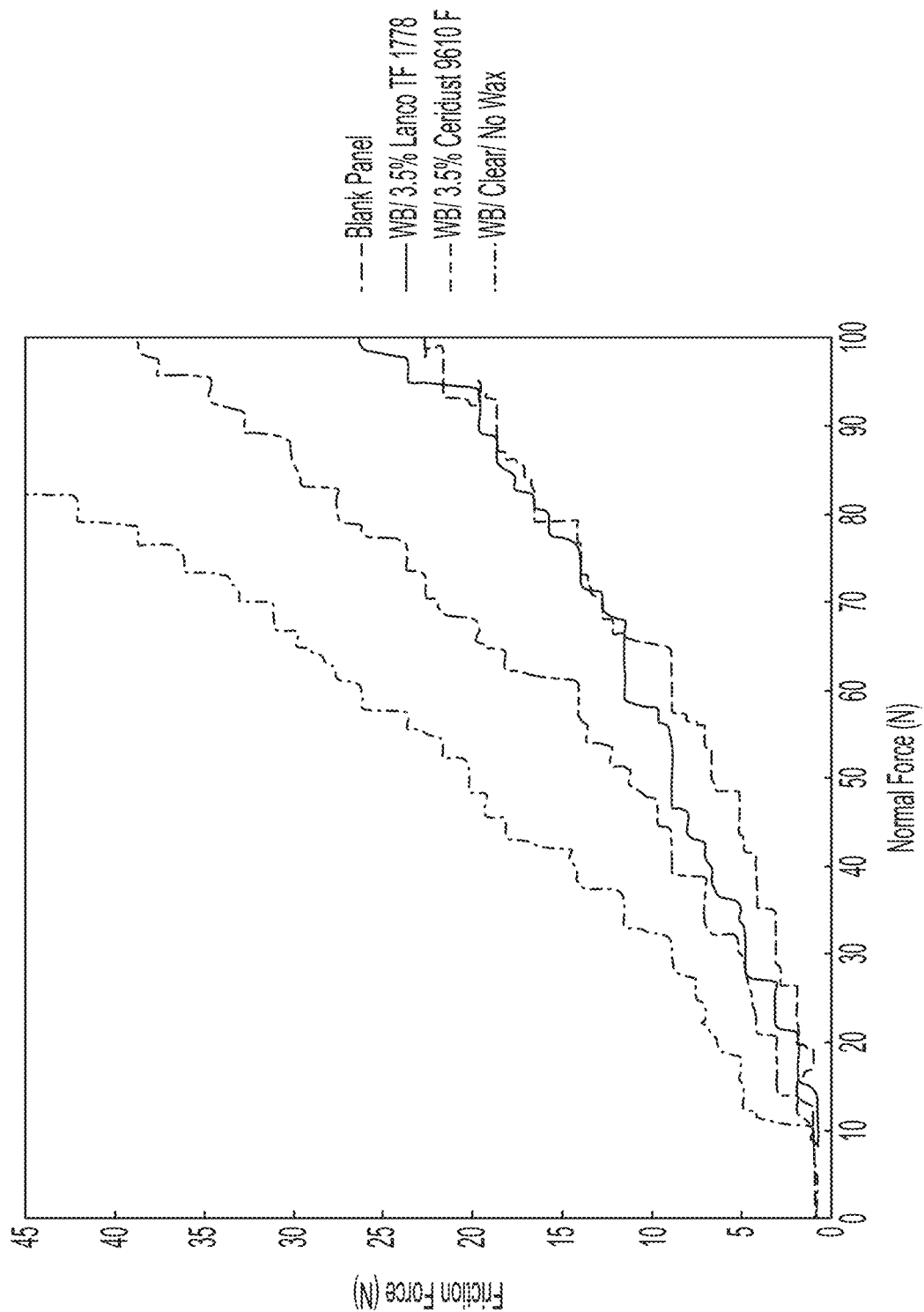
FIG. 19 illustrates a graph showing the impact of two separate wax additions to a water-based clear coating on friction force as a function of normal force, measured using the dry, cure, and adhesion testing device of FIG. 2.

FIG. 19 displays the friction force versus normal force load results obtained. FIG. 19 shows that friction force increases for all samples as normal force load increases, and that the WB/Clear/No wax water-based formulation result in the overall greatest friction force. Addition of wax dramatically reduces the resulting friction force, with the WB/3.5% Lanco TF 1778 lowering the friction force the greatest in this test, approximately equivalent to the blank panel.

Prophetic Example 9—Drying of the Sample

To assess the drying of the Sample of Example 1, the Sample will be drawn down onto a 9 inches long, by 6 inches wide ¼ inch thick plate glass substrate 40, using a 6 mil bird bar having a length of 7.5 inches and a gap width of 6 inches (BYK-Gardner USA, 9104 Guilford Rd, Columbia, Md.). The drawdown will be made such that the width of the bird bar runs parallel to the 9 inch dimension of the plate glass substrate 40. The time of the drawdown will be noted.

Immediately after drawdown, the plate glass substrate 40 with wet film 39 will be moved to the substrate support platform 15 of the drying and adhesion testing device 45 of FIG. 3, equipped with a stylus 37 and probe 9 wherein the probe will be a 9.5 mm diameter ball composed of Teflon. The substrate 40 with wet film 39 having a test surface 16 will be placed against a stopper 60 located on the substrate support platform 15. The probe 9 will be manually adjusted to about 5 mm above the surface of the film 39 such that the center of the ball is about 10 mm from the edge of the drawdown.

A drying test will be initiated by starting the horizontal drive system 13 which will move the substrate with test surface 16 at a rate of 0.021 minis simultaneous to a deadweight load of 10 g onto the pendulum bar 8 and thus stylus 37 and probe 9 at a loading rate of 5 mm/min. The substrate with test coating 39 will be allowed to move under the stylus 37 and probe for a distance of about 140 mm or for a duration of roughly 2 hours under a deadweight load of 10 g.

It is believed that similar results will be achieved as in Example 3, which uses a dynamically controlled constant load of 10 g rather than a deadweight. These results are seen in FIGS. 11-14.

We claim:

1. A material testing device, comprising:
   a platform configured to support a material to be tested;
   a drive system and/or a motor configured to move the platform in one or both of X and Y directions;
   a probe;
   a stylus configured to support the probe;
   wherein the probe configured to contact the material to be tested when a load is imposed on the stylus and the probe;
   an angle sensor configured to measure the angle of the probe relative to the platform;
   a linear position sensor configured to measure the position of the platform relative to the probe;
   a control system comprising a control center configured to be programmed with a set of testing parameters;
   wherein the platform is configured to move in one or both of the X and Y direction relative to the probe in response to commands received from the control system based on the set of testing parameters.

2. The device of claim 1, wherein the material is a liquid film, a paint, a coating, a metal, a metal alloy, a composite, a plastic, a wood, a mineral, or any combination thereof.

3. The device of claim 1, wherein the device is configured to measure friction, hardness, scratch resistance, mar resistance, print resistance, adhesion, drying, or curing properties of the material.

4. The device of claim 1, further comprising:
   a plurality of sensors in communication with the control center, the plurality of sensors including a load cell sensor, a friction sensor, a transducer, or any combination thereof; and
   a load generating device configured to impose the load on the stylus and probe.

5. The device of claim 4, wherein the load generating device comprises a dead weight, a dynamic loading device, or a fixed loading device.

6. The device of claim 4, wherein the friction sensor is separate from the probe and/or the stylus.

7. The device of claim 4, wherein the transducer comprises one or more of an encoder, a sensor, or read head paired with a code position.

8. The device of claim 4, wherein the control system is configured to sense and/or control a load from the load generating device.

9. The device of claim 1, wherein the material is a liquid film on a substrate comprising a well or a flat plate.

10. The device of claim 1, wherein the stylus comprises a removeable clamp for supporting the probe.

11. The device of claim 1, wherein the probe comprises a circular, conical, rectangular, v-edge, or angular cross-section.

12. A method of using a testing device to measure a property of a material, comprising:
   (a) programming a control center of the testing device with a set of testing parameters;
   (b) positioning a substrate comprising a material onto a platform of the testing device;
   (c) bringing a probe of the testing device into contact with the material;
   (d) applying a vertical load to the probe using a load generating device such that a force is imparted on the material;
   (e) moving the platform relative to the force applied to the probe; and
   (f) sensing a height of the probe relative to the substrate;
   wherein the testing device further comprises an angle sensor configured to measure the angle of the probe relative to the platform; a linear position sensor configured to measure the position of the platform relative to the probe; and a control system comprising a power supply and the control center;
   (g) measuring the angle of the movement of the probe; and
   (h) converting the angle measurement to a linear measurement.

13. The method of claim 12, further comprising setting a test start position for the probe that results in a test start distance of less than about 15 mm and initial static force of less than about 0.1 N.

14. The method of claim 12, further comprising one or more of the following steps: controlling the vertical load applied to the probe using the control systems or detecting the friction force imparted on the probe.

15. The method of claim 14, wherein measuring the angle comprises a magnetic rotary encoder and/or an angle encoder based on photoelectric scanning principles.

16. The method of claim 12, wherein the material comprises a liquid film and the probe is brought into contact with the liquid film after the liquid film is applied to the substrate and remains in contact with the liquid film until the liquid film solidifies.

17. The method of claim 12, wherein the testing device is configured to measure friction, hardness, scratch resistance, mar resistance, print resistance, adhesion, drying, or curing properties of the material.

* * * * *